United States Patent
Drake

(10) Patent No.: US 8,562,777 B2
(45) Date of Patent: *Oct. 22, 2013

(54) METHOD AND APPARATUS FOR CONTINUOUSLY FORMING DYE SUBLIMATION IMAGES IN SOLID SUBSTRATES

(75) Inventor: Jonathan C. Drake, Carmel Valley, CA (US)

(73) Assignee: Fresco Plastics LLC, Carmel Valley, CA (US)

(*) Notice: Subject to any disclaimer, the term of this patent is extended or adjusted under 35 U.S.C. 154(b) by 363 days.

This patent is subject to a terminal disclaimer.

(21) Appl. No.: 10/950,028

(22) Filed: Sep. 23, 2004

(65) Prior Publication Data

US 2005/0070434 A1    Mar. 31, 2005

Related U.S. Application Data

(60) Division of application No. 10/084,262, filed on Feb. 26, 2002, now Pat. No. 6,814,831, which is a continuation-in-part of application No. 09/823,290, filed on Mar. 29, 2001, now Pat. No. 6,998,005.

(51) Int. Cl.
*B44C 1/165*  (2006.01)
*B29C 65/00*  (2006.01)
*C09J 5/00*  (2006.01)

(52) U.S. Cl.
USPC ............ 156/230; 156/247; 156/277; 156/311

(58) Field of Classification Search
None
See application file for complete search history.

(56) References Cited

U.S. PATENT DOCUMENTS

| | | | |
|---|---|---|---|
| 3,061,567 A | 10/1962 | Keil | |
| 3,649,332 A | 3/1972 | Dybvig | 117/38 |
| 4,059,471 A | 11/1977 | Haigh | 156/244 |
| 4,202,663 A * | 5/1980 | Haigh et al. | 8/471 |
| 4,242,092 A * | 12/1980 | Glover | 8/472 |
| 4,314,814 A | 2/1982 | Deroode | |
| 4,350,545 A | 9/1982 | Garabedian | 156/87 |
| 4,465,728 A | 8/1984 | Haigh et al. | 428/156 |
| 4,662,966 A | 5/1987 | Sumi et al. | 156/230 |

(Continued)

FOREIGN PATENT DOCUMENTS

| | | |
|---|---|---|
| GB | 2338210 | 12/1999 |
| JP | 11-48389 | 2/1999 |
| JP | 11-199116 | 7/1999 |

(Continued)

OTHER PUBLICATIONS

PCT International Search Report, dated Aug. 7, 2002.

(Continued)

*Primary Examiner* — Philip Tucker
(74) *Attorney, Agent, or Firm* — Beyer Law Group LLP

(57) ABSTRACT

A method for forming a dye sublimation image in a substrate with a dye carrier having an image formed thereon of a sublimatic dyestuff is provided. The image of the dye carrier is placed against a first surface of the substrate. The substrate and dye carrier are conveyed along a path with a first part and a second part. A continuous pressure is provided against the first surface of the substrate in the first part and second part of the path and therebetween. The dye carrier is heated to a sublimation temperature in the first part of the path. The dye carrier is then cooled to a depressure temperature in the second part of the path.

12 Claims, 24 Drawing Sheets

(56) References Cited

U.S. PATENT DOCUMENTS

| | | | |
|---|---|---|---|
| 4,664,672 A | 5/1987 | Krajec et al. ................ 8/472 |
| 4,670,080 A | 6/1987 | Schwarz et al. | |
| 4,670,084 A | 6/1987 | Durand | |
| 4,816,314 A | 3/1989 | Prawdzik et al. | |
| 4,880,667 A | 11/1989 | Welch ..................... 427/160 |
| 4,997,507 A | 3/1991 | Meyer ..................... 156/286 |
| 5,308,426 A | 5/1994 | Claveau .................. 156/234 |
| 5,580,410 A | 12/1996 | Johnston ................. 156/240 |
| 5,590,600 A * | 1/1997 | Hale et al. ............... 101/488 |
| 5,593,532 A | 1/1997 | Falk et al. ............... 156/285 |
| 5,616,199 A | 4/1997 | Jurrius et al. | |
| 5,630,894 A * | 5/1997 | Koch et al. ............... 156/64 |
| 5,634,731 A * | 6/1997 | Kita et al. ............. 400/120.18 |
| 5,962,368 A | 10/1999 | Poole ..................... 503/227 |
| 5,997,677 A | 12/1999 | Zaher ..................... 156/230 |
| 6,110,316 A | 8/2000 | Kobayashi et al. ......... 156/230 |
| 6,136,126 A | 10/2000 | Fenzi | |
| 6,149,754 A | 11/2000 | Ogata et al. | |
| 6,165,938 A | 12/2000 | Narita et al. | |
| 6,220,328 B1 | 4/2001 | Pourmand et al. .......... 156/498 |
| 6,227,271 B1 | 5/2001 | Pourmand et al. .......... 156/498 |
| 6,249,297 B1 * | 6/2001 | Lion ....................... 347/171 |
| 6,344,103 B1 | 2/2002 | Cheng et al. | |
| 6,349,754 B1 * | 2/2002 | Johnson et al. ............ 156/221 |
| 6,392,680 B2 | 5/2002 | Akada et al. .............. 347/213 |
| 6,447,629 B1 * | 9/2002 | Thompson et al. .......... 156/230 |
| 6,623,677 B1 | 9/2003 | Smith et al. .............. 264/132 |
| 6,814,831 B2 | 11/2004 | Drake | |
| 6,835,267 B1 * | 12/2004 | Spain et al. .............. 156/230 |
| 6,998,005 B2 | 2/2006 | Magee et al. | |
| 7,025,451 B2 | 4/2006 | Mabbott | |
| 2001/0005603 A1 | 6/2001 | Kubota | |

FOREIGN PATENT DOCUMENTS

| | | | |
|---|---|---|---|
| JP | 2000-351924 A | | 12/2000 |
| JP | 2001-329474 A | | 11/2001 |
| JP | 2008-238812 A | | 10/2008 |
| JP | 49-42373 A | | 5/2012 |
| KR | 20020040962 | | 5/2002 |
| WO | WO 96/18509 | * | 6/1996 |
| WO | WO9618509 | | 6/1996 |
| WO | WO9962722 | | 12/1999 |
| WO | WO 0187643 A1 | | 11/2001 |
| WO | WO 02079566 A1 | | 10/2002 |

OTHER PUBLICATIONS

Supplemental Partial European Search Report, dated Feb. 10, 2006.
Office Action dated Jul. 18, 2007 for U.S. Appl. No. 11/204,830.
European Office Action dated Apr. 26, 2007 for related European Patent Application No. 02725420.0.
Japanese Office Action dated Jul. 24, 2007 for related Japanese Application No. 2002-577963 with English Translation.
Final Office Action dated Dec. 28, 2007 for related U.S. Appl. No. 11/204,830.
Office Action dated Nov. 27, 2007 for related Japanese Patent Application No. 2002-577963.
International Search Report dated Apr. 18, 2008 from International Application No. PCT/US07/76388.
Written Opinion dated Apr. 18, 2008 from International Application No. PCT/US07/76388.
Chinese Office Action dated Apr. 4, 2008 from Chinese Application No. 200610074147.0.
Office Action dated Jun. 12, 2008 from U.S. Appl. No. 11/204,830.
Office Action dated Jun. 30, 2008 from U.S. Appl. No. 11/508,565.
An official action dated May 30, 2008 from Mexican National Phase PCT Patent Application No. 06/08464.
Examination Report dated Jul. 7, 2008 from European Patent Application No. 02 725 420.0.
Office Action dated Dec. 22, 2008 from U.S. Appl. No. 11/204,830.
Office Action dated Dec. 29, 2008 from U.S. Appl. No. 11/508,565.
An official action dated Nov. 21, 2008 from Mexican National Phase PCT Patent Application No. 06/08464.
Japanese Office Action dated Oct. 24, 2008 from Japanese Application No. 2002/577963.
Canadian Exam Report dated Dec. 4, 2008 from Canadian Application No. 2,442,070.
First Examination Report dated Feb. 12, 2009 from Indian Patent Application No. 1147/KOLNP/2003.
Office Action dated Mar. 25, 2009 from U.S. Appl. No. 11/204,830.
Office Action dated May 13, 2009 from U.S. Appl. No. 11/508,565.
Office Action dated Oct. 1, 2009 from U.S. Appl. No. 11/204,830.
Examination Report dated Nov. 2, 2009 from Canadian Patent Application No. 2,442,070.
Japanese Office Action dated Oct. 6, 2009 from Japanese Patent Application No. 2008-045777.
Chinese Office Action dated Dec. 11, 2009 from Chinese Patent Application No. 200610074147.0.
Office Action dated Feb. 11, 2010 from Australian Patent Application No. 2007249071.
Final Office Action dated Feb. 26, 2010 from U.S. Appl. No. 11/508,565.

* cited by examiner

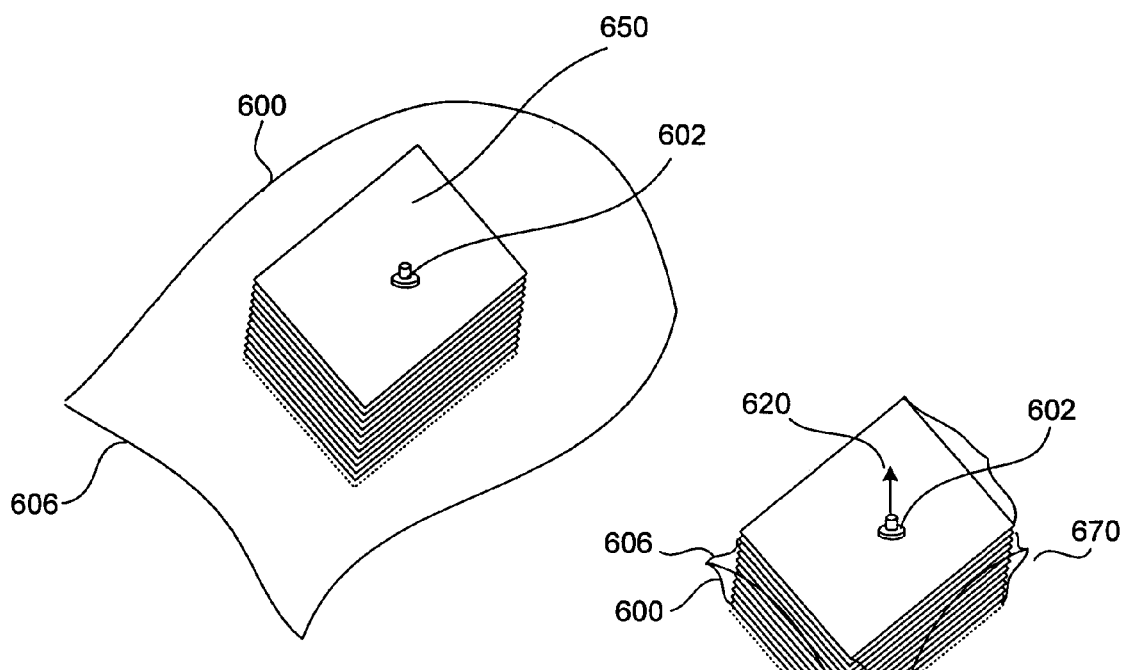
FIG. 14C
FIG. 14D
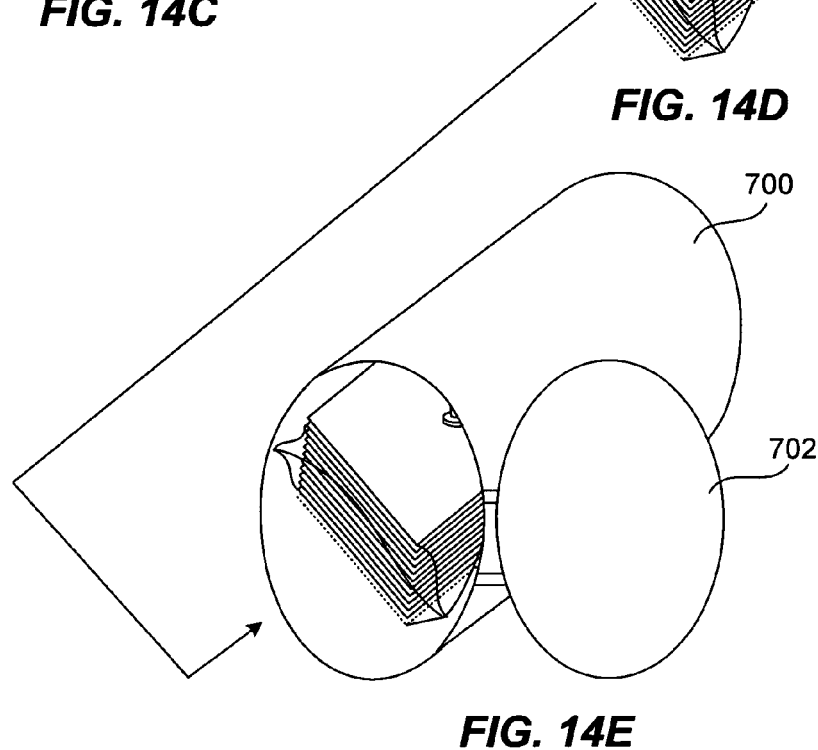
FIG. 14E

METHOD AND APPARATUS FOR CONTINUOUSLY FORMING DYE SUBLIMATION IMAGES IN SOLID SUBSTRATES

CROSS-REFERENCE TO RELATED PATENT APPLICATIONS

This is a divisional of prior U.S. application Ser. No. 10/084,262 filed on Feb. 26, 2002, now U.S. Pat. No. 6,814,831, which is incorporated by reference, which is a Continuation-in-Part of U.S. patent application Ser. No. 09/823,290 filed Mar. 29, 2001, now U.S. Pat. No. 6,998,005.

FIELD OF THE INVENTION

The present invention relates to the formation of images within solid sheets of plastic. More particularly, the present invention relates to a methodology for continuously forming dye sublimation, or dye transfer, images within solid sheets of plastic.

BACKGROUND OF THE INVENTION

From the advent of plastics, users and manufacturers thereof have sought workable means for imprinting or forming images thereon. Prior imaging technologies suitable for use on other materials, for instance metals, wood, and the like, have not generally met with success when used to perform permanent imaging on plastics. Examples of such prior imaging technologies include, but are not limited to, paints, decals, lacquers, and dyes. In general, the problems associated with utilizing prior imaging or marking technologies center on certain chemical and physical properties of plastics in general.

One of the great advantages of plastics is that they can be formed into complex shapes having inherently very smooth surfaces. While this is an advantage in the manufacture of such plastic objects, the extremely smooth and often chemically resistant nature of plastic surfaces renders the application thereto of paints and the like less than satisfactory. Many paints, for instance enamels, when applied to plastics, tend to flake or peel when the plastic is flexed or when the image is subjected to physical distress, such as abrasion or temperature change.

In searching for a methodology for forming permanent, abrasion-resistant images in sheet plastics, workers in this field have noted that plastics tend to be molecularly similar to certain fabrics which are imaged utilizing a dyeing process known as "dye sublimation". According to known dye sublimation processes, an image, for instance a decorative design, is formed of sublimation printing inks on a dye carrier, sometimes also referred to as a transfer paper or auxiliary carrier. Dye carriers are often, but not exclusively, formed of paper. Printing the image on the dye carrier is carried out by any of several known printing methods including, but specifically not limited to, offset or rotary printing methods. The print images formed on the dye carrier are transferred by sublimation, also called transfer printing, from the dye carrier to the textile or fabric which is to be decorated with the design.

There are several known dyestuffs suitable for use with dye sublimation printing techniques. The actual dyestuff or dye carrier utilized is not essential to the principles of the present invention, provided that the dyestuff is capable of sublimation. This is to say that the dyestuff sublimates directly to the vapor state from the solid state upon the application of heat. One type of printing ink suitable for sublimation printing is prepared from sublimable dyestuffs utilizing binders and oxidation additives. The term "sublimable" is defined herein to mean capable of sublimation.

Currently, to form a dye sublimation image in a textile, the printed dye carrier is placed with its color-imprinted side on the textile face to be imprinted and is thereafter heated. As soon as the dyestuffs reach a temperature of about 170-220° C., those dyestuffs sublime into the textile and the desired image is thereby formed in that textile.

From the foregoing discussion, it will be appreciated that one of the advantages of dye sublimation printing is that the image is actually formed within the structure of the textile, or substrate, on which it is imprinted. This is in direct contrast to most printing techniques, wherein the image is formed solely on the surface of the substrate. While surface-formed images are completely suitable for many applications, they are less than optimal for others. By way of illustration, in the preceding discussion of dye sublimation images formed in textiles, it will be appreciated that if a textile is subjected to substantial wear, as is a carpet, an image formed solely on the surface of that carpet, or on the surface of the individual carpet fibers, will tend to wear quickly.

It will further be appreciated that most inks suitable for forming surface images tend to be opaque. Again, this is suitable for many applications. However, where it is desirous that the resultant article has a lustrous or translucent property, the use of such opaque inks precludes the desired translucent image.

U.S. Pat. No. 3,649,332 to Dybvig discloses an early attempt at transfer printing of plastics. According to '332, a photo-sensitive dye carrier having an image formed thereon is placed against a porous paper temporary receptor sheet on a vacuum platen and sufficient vacuum is established to hold the two sheets in close contact and in fixed position. The transfer sheet has a dye coating on the surface contacting the receptor sheet and a photoconductive zinc oxide coating on the outer surface. The outer surface is exposed to a color separation light image from a positive color original, to impart a latent image.

A conductive roller carrying a coating of conductive radiation-absorptive toner particles at a high potential is passed over the exposed surface to deposit toner at the non-light-struck areas. The surface is then briefly exposed to intense infrared radiation causing transfer of dye to the receptor at the infrared absorptive toned areas. The vacuum is then released, and the photosensitive sheet is removed and replaced with a second photosensitive sheet carrying a second dye, and the process is repeated utilizing an appropriate color separation filter. This process is again repeated using a third filter and photosensitive sheet to produce a full three-color intermediate.

One or more portions of the intermediate are then cut from the sheet. These segments are placed against a transparent dye-receptive film in a desired arrangement, and over them is placed a paper dye source sheet having a blue dye coating as previously described, but minus the photoconductive coating of the transfer sheet. The three layers are pressed together and briefly heated. Thereafter the film is removed and is found to retain a brilliantly clear, full-color copy of the detail sections on an equally clear blue background.

U.S. Pat. Nos. 4,059,471, 4,202,663, and 4,465,728 to Haigh, or Haigh deceased et al. detail methodologies for forming dye transfer images in plastic surfaces, especially thin films. These several patents flow either directly from or as a divisional or continuation-in-part of U.S. patent application Ser. No. 540,383 filed Jan. 13, 1975. Each of these patents utilizes a dye transfer process for forming a dye pattern on a dye receptor plastic web, most especially thin films of from 2 to 20 mils in thickness, by interposing a carrier web, for instance a polyolefin carrier web, between the dye receptor plastic web and a transfer web containing dispersed dyes. Thereafter, the several webs are pressed together in close contact and are heated to a sublimation temperature suitable for the dyes, and the several webs are maintained at the sublimation temperature until a substantial portion of the dyes has sublimed and transferred from the transfer web through the polyolefin web to the dye receptor web. Thereafter, the several webs are cooled below the softening temperature of the dye receptor web, and the dye receptor web is separated from the other webs.

U.S. Pat. No. 4,242,092 to Glover teaches a method of sublimatic printing on air-permeable sheet structures, such as carpets or tiles. According to '092, an air-permeable sheet structure is imprinted by placing an air-permeable printing foil carrying on one side thereof a sublimatic dyestuff in a face-to-face relationship, and in close proximity, with the air-permeable sheet structure. The side of the foil having the dyestuff imprinted thereon is placed in contact with the air-permeable sheet structure, and the foil is heated at a temperature and for a period of time suitable to vaporize the dyestuff. At the same time, a gas or vapor pressure differential is applied so as to create a flow of air from a space above the foil, and through both the foil and the sheet structure, thereby causing the dyestuff vapor to flow into the sheet structure and to form an image therein.

U.S. Pat. No. 4,662,966 to Sumi et al. teaches an apparatus for transfer printing a plurality of articles, for instance typewriter keys, which are held on a plane in rows and then heated. '966 discloses that this apparatus further includes conveyors for conveying the plurality of articles to a heating outlet, the heating outlet having infrared radiation heaters provided inside. The apparatus further includes a holding device for holding the articles at a predetermined position with respect to the article holder. Another holder is designed to hold a transfer sheet at a second predetermined position. The transfer sheet has a pattern layer formed thereon of thermo-diffusable dye. There is also provided a means for pressing the transfer sheet against the articles so that the pattern is transfer-printed on the articles, and a conveyor for conveying the article holder with the plurality of articles thereon through the heating apparatus and the various holding devices.

U.S. Pat. No. 4,664,672 to Krajec et al. teaches a method for transfer printing onto objects made of plastic, or having a plastic surface coating, by pressing a thin dye carrier on the surface to be printed during the dye transfer process. This is effected by means of super-atmospheric gas pressure, whereby the surface is kept at a temperature below the thermoplastic range of the plastic object. According to the methodology taught by '672, a dye carrier, for instance a paper dye carrier, is pre-dried below the sublimation temperature of the ink. The dye carrier is clamped, for instance in a spectacle frame in close proximity above but not touching the surface to be printed. Thereafter, a gas under pressure is applied to the backside of the carrier, which gas exerts a slight super-atmospheric pressure directly or indirectly against the backside of the dye carrier, pressing the carrier against the object. Thereafter, a heat source, for instance a heat radiator, is placed so that its radiation is directed toward the backside of the dye carrier.

U.S. Pat. No. 5,308,426 to Claveau teaches a process for forming sublimation images on objects, evidently irregular non-planar objects, by forming an "ink support" from a material which is both extensible and air permeable and which will conform to the shape of the object. This ink support is used to envelop the object, which is then placed in a vacuum machine. The vacuum machine, with the ink support inside, is then introduced into a heated space, causing transfer of the decoration over the whole surface of the object to be decorated. Examples of extensible air-permeable materials suitable as ink carriers for utilization in the '426 invention include woven fabrics, knitted fabrics, and sheets of non-woven material.

U.S. Pat. No. 5,997,677 to Zaher teaches a methodology for applying a colored decorative designed on a plastic substrate by heating the carrier and then placing the carrier in contact with the substrate by air suction, such that a sub-pressure results between the carrier and the substrate. Thereafter, an inhomogeneous exposure of infrared radiation is directed to the carrier in correspondence with the prevalent color portion of the dyestuff to which the radiation is applied.

Many of the known dye sublimation printing methodologies applied to solid plastics are so sensitive to variations in pressure, temperature, dye lot, substrate lot, and other manufacturing variables, that at least one inventor has directed his inventive efforts solely to the task of pre-conditioning a plastic substrate for dye sublimation printing. This pre-conditioning is taught and explained in U.S. Pat. No. 5,580,410 to Johnston.

Given that the formation of precise, vibrant, durable images in solid plastic sheets is a long-sought goal of the plastics imaging industry, why are there currently no flat solid sheets of plastic which have been imprinted utilizing this methodology, which sheets are formable into commercial articles? The lack of success on the part of other inventors in this field is largely due to the fact that, while the inventions disclosed in the previously discussed patents may theoretically be capable of implementation, in actual practice their use has failed to produce imaged flat plastic sheets at commercially acceptable costs or in commercially acceptable volumes. There are several reasons for this lack of success.

The first reason that many known processes have not resulted in commercially successful imaged articles is that they are slow. An imaging process which requires an extended period of time to successfully form an image, or which requires a large number of complex and delicate steps to effect, may result in a successfully imaged flat plastic sheet, but one whose imaging is so expensive as to render it commercially non-viable. Moreover, previous imaging processes are so sensitive to temperature variations that very slight changes in processing temperatures result in unacceptable images or destroyed substrates.

The second reason that many of these known processes have failed to yield the desired result is closely related to some of these process variables previously discussed. One particularly aggravating shortcoming of many prior dye sublimation imaging processes is that, in order to form the dye sublimation image in a solid plastic substrate, that substrate must have its temperature elevated above its thermoplastic limit. In many cases, this results in substantial liquefaction of the substrate, with attendant unwanted adhesion of the dye carrier to the now liquefied and sticky substrate. This, of course, results in a substrate having at least a portion of the dye carrier adhered thereto, often permanently. Even where it is possible to scrape the adhered dye carrier from the cooled substrate, this scraping not only results in a poor surface finish, but also requires significant cost in terms of additional man-hours to effect.

Some of the previously discussed inventions, in order to obviate the unwanted adhesion of dye carriers to sticky substrates, have relied upon placing some material between the substrate and the dye carrier. Examples of these materials include parting compounds, such as talcum, or permeable webs. The introduction of such parting or separating materials may preclude, in some instances, the unwanted adhesion of the dye carrier to the substrate, but this is done with significant degradation of the imaged article. These methodologies are admitted to cause degradation in surface finish, image resolution, or image registration on the substrate.

Finally, and most importantly, when applied to solid plastic sheets, known dye sublimation imaging processes tend to shrink, warp and distort those sheets. While the degree of shrinkage, warping, and distortion varies from process to process and substrate to substrate, these defects, encountered utilizing known dye sublimation imaging technologies, result in anything from mildly rumpled surfaces to wildly distorted sheets having all the planarity of potato chips. Since the object of dye sublimation imaging of solid plastic sheets is to form an image within the sheet while retaining its substantially planar nature in an un-shrunken, un-warped and distortion-free state, none of the known processes can be said to be fully successful. Moreover, one or more of the technical performance specifications of plastic sheets imaged by other dye sublimation processes are often lost by subjecting the sheets to the process. These technical performance specifications include, but are not limited to, shrinkage, impact resistance, dimensionality, and mechanical strength.

What is clearly needed is a methodology for forming a durable, clear, sharp image in a solid, flat sheet of plastic by means of a dye sublimation process that results in an un-shrunken, un-warped, distortion-free plastic sheet which retains all of the original plastic sheet's technical performance specifications.

Accordingly, what is finally needed is at least one methodology for continuously forming dye transfer images in solid substrates, and an apparatus capable of performing the methodology.

SUMMARY OF THE INVENTION

The present invention provides a method for forming a dye sublimation image in a substrate with a dye carrier having an image formed thereon of a sublimatic dyestuff. The image of the dye carrier is placed against a first surface of the substrate. The substrate and dye carrier are conveyed along a path with a first part and a second part. A continuous pressure is provided against the first surface of the substrate in the first part and second part of the path and therebetween. The dye carrier is heated to a sublimation temperature in the first part of the path. The dye carrier is then cooled to a depressure temperature in the second part of the path.

In an alternative, an apparatus for forming a dye sublimation image in a first surface of a substrate with a dye carrier having an image formed thereon of a sublimatic dyestuff is provided. A conveyor is provided for moving the substrate and dye carrier along a path with a first part and a second part. A continuous pressure system presses the image formed on the dye carrier against the first surface of the substrate, wherein the continuous pressure system applies a continuous pressure against the first surface of the substrate in the first part and second part of the path. A heater is provided for heating the dye carrier to a sublimation temperature when the substrate and dye carrier are in the first part of the path. A cooler is provided for cooling the dye carrier to a depressure temperature when the substrate and dye carrier are in the second part of the path, wherein the continuous pressure is continuously applied from before the heating until after the dye carrier is cooled.

In addition, a method of forming a formed object with a sublimated image is provided. A dye carrier with an image is provided. The image of the dye carrier is placed against a first surface of a substrate. The dye carrier is heated to a temperature above a glass transition temperature of the substrate, while in a continuous process machine. The dye carrier is cooled to a temperature below the glass transition temperature of the substrate, while in the continuous process machine. The dye carrier is removed from the substrate, wherein the image has been sublimated into the first surface of the substrate. The substrate is heated. The substrate is thermal formed into the formed object. The formed object is cooled.

In addition, a method of providing a sublimated image on a plastic substrate is provided. A digital image is selected on a computer. A computer printer is used to print the selected digital image on a dye carrier with dye sublimation inks. The image of the dye carrier is placed against a first surface of a substrate. The dye carrier is heated to a temperature above a glass transition temperature of the substrate, while, in a continuous process machine. The dye carrier is cooled to a temperature below the glass transition temperature of the substrate, while in the continuous process machine. The dye carrier is removed from the substrate, wherein the image has been sublimated into the first surface of the substrate.

In addition, a method of forming a sublimated image in a laminated substrate is provided. A film with an image on a first side of the film is provided. The first side of the film is laminated to a substrate. The image is sublimated into the substrate.

In addition, a laminated substrate with a sublimated image is provided. A film with an image on a first side of the film is provided. The first side of the film is laminated to a substrate. The image is sublimated into the substrate.

These and other advantages of the present invention will become apparent upon reading the following detailed descriptions and studying the various figures of the Drawing.

BRIEF DESCRIPTION OF THE DRAWING

For a more complete understanding of the present invention, reference is made to the accompanying Drawing in the following Detailed Description of the Invention. In the drawing:

FIGS. 14A-E illustrate an alternate vacuum bag implementation of the present invention.

Figure 1A:
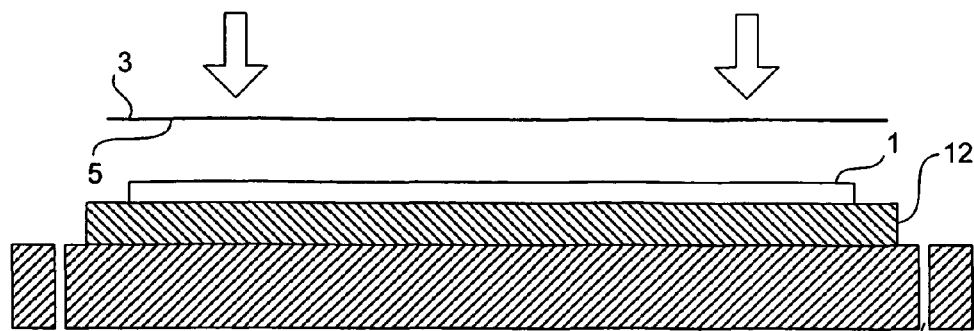
FIGS. 1A-H are cross-sectional views through a platen assembly according to the present invention, demonstrating the method thereof.

Reference numbers refer to the same or equivalent parts of the invention throughout the several figures of the Drawing.

DETAILED DESCRIPTION OF THE INVENTION

The succeeding discussion centers on one or more preferred embodiments of the present invention, implemented by a number of components. Those having skill in the art will understand that, where the embodiments enumerated herein specify certain commercially available components, these are by way of example. The principles of the present invention are capable of implementation in a wide variety of configurations and these principles specifically contemplate all such embodiments.

While the succeeding discussion is directed to the dye sublimation imaging of plastic sheets and the like, the principles of the present invention may advantageously be applied to the dye sublimation imaging of a wide variety of man-made and naturally occurring sheet material substrates, including but specifically not limited to metals, stone, wood, waxes, polymers, monomers, resins, textiles, fabrics, glasses, minerals, leather, and composites thereof. The principles of the present invention specifically contemplate all such applications.

Having reference now to FIGS. 1A through 1H, a methodology taught by the present invention for forming dye sublimation images in substrates, particularly in solid plastic substrates, is shown. At FIG. 1A is shown a platen 10, having superimposed thereon a passive cooling device 12. The principles of the present invention specifically contemplate the utilization of either or both active and passive cooling devices, as will be explained later. Platen 10, in one embodiment of the present invention, is a flat aluminum plate transfixed by a plurality of vacuum orifices 14. Vacuum orifices 14 are further connected to a vacuum system 240. Placed atop passive cooling device 12, for purposes of forming a dye sublimation image therein, is substrate 1. In order to form the dye sublimation image, dye carrier 3, having an image 5 imprinted thereon utilizing the previously discussed dye sublimation inks, is placed atop substrate 1.

The passive cooling device 12 of this embodiment of the present invention consists of a panel having an extremely low thermal mass, for reasons which will be later explained. One embodiment of the present invention contemplates the utilization of a hex-cell aluminum-cored composite sandwich panel having glass-reinforced plastic upper and lower surfaces. One such panel suitable for implementation as passive cooling device 12 is a Fiber-Lok No. 2330 sandwich panel available from Burnham Composites, Wichita, Kans. According to this embodiment of the present invention, passive cooling device 12 is of smaller surface extent than platen 10, but is at least as broad in extent as the substrates which will be processed on it. This is necessary in order that there be at least some of the plurality of vacuum orifices 14 available to form a vacuum path for membrane 16, as will be subsequently explained.

Figure 1B:
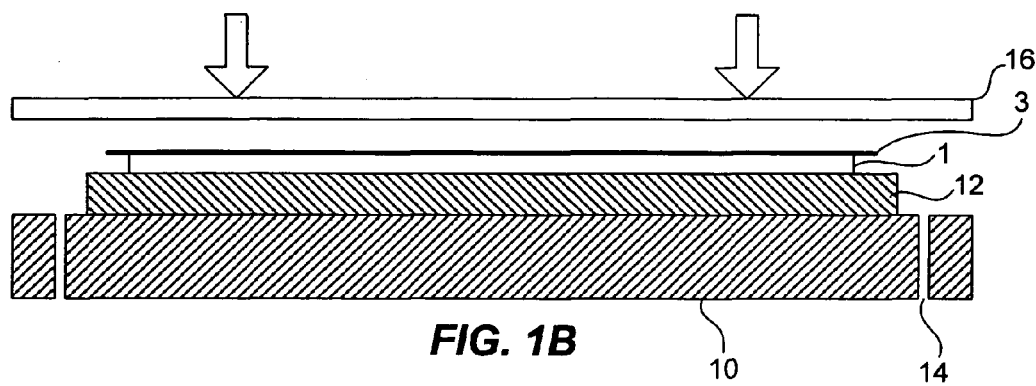

Referring now to FIG. 1B, membrane 16 is applied over the stack comprising cooling device 12, substrate 1, and dye carrier 3. Membrane 16 further overlaps at least a portion of platen 10. Membrane 16, for ease of handling, may be fitted to a spectacle frame, not shown in this figure. Membrane 16 should be capable of forming a substantially airtight seal for purposes of clamping the substrate-dye carrier stack together in close proximity. Membrane 16 should also have sufficient strength to prevent the warping of substrate 1 during the thermal events which constitute one dye sublimation cycle and which enable dye sublimation imaging and dye carrier removal, as will be later explained.

Other properties desirable of membrane 16 are that it is substantially chemically compatible not only with substrate 1 and the sublimatic dyes imprinted on dye carrier 3, but also with any byproducts out-gassed from substrate 1 or dye carrier 3 during dye sublimation imaging.

In one embodiment of the present invention, the lower surface of membrane 16 is lightly textured to provide a continuous vacuum channel across the interface between membrane 16 and dye carrier 3 without forming bubbles between the membrane and dye carrier. These bubbles would preclude even clamping of dye carrier 3 to substrate 1. This texture also serves as a vacuum release and as a bleeder to trail off the vacuum when it is no longer needed for clamping.

Moreover, in order to smoothly mold and flow over the several elements of the cooling device-substrate-dye carrier stack, as well as to platen 10, it is desirable that membrane 16 be formed of a flexible material. When used on dye carrier-substrate-cooling device stacks having significant vertical extent, for instance greater than about one inch in thickness, it further desirable that the membrane be formed of an elastomeric material to more smoothly mold and flow over these several elements. As the imaging process taught herein utilizes rapid temperature changes, as well as sustained periods of temperatures up to 600° F., it is also required of the membrane that it be not only heat-resistant, but that it be capable of withstanding repeated thermal cycles between higher and lower temperatures without hardening, cracking, loss of structural integrity or loss of any of the previously discussed properties.

From the foregoing discussion, it will be appreciated that a number of materials are suitable for membrane 16. Examples of such materials include, but are specifically not limited to, vulcanized rubbers, silicones, butyl rubbers, polymers, chloropolymers, fluoropolymers, and other natural or man-made elastomeric sheets. Membrane 16 is brought into substantially continuous contact with dye carrier 3, and covers substantially all of the plurality of vacuum orifices 14 not previously covered by passive cooling device 12.

Figure 1C:
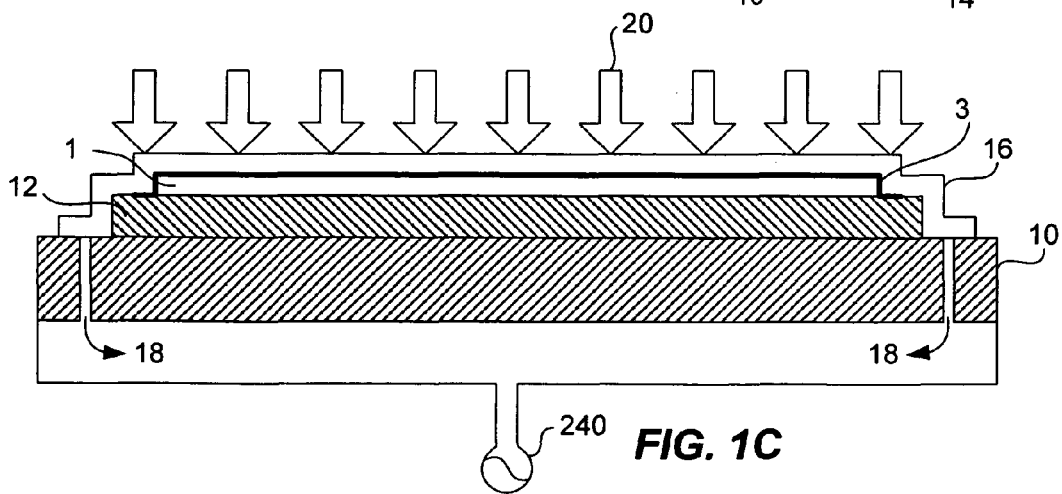

Referring now to FIG. 1C, the clamping step of one embodiment of the present invention is explained. Membrane 16, having previously been positioned over the dye carrier-substrate-cooling device stack, as well as at least a portion of platen 10 including at least one and preferably a plurality of vacuum orifices 14, now exerts an atmospheric clamping pressure, as shown at 20. As used herein, the term "atmospheric clamping pressure" denotes the use of a pressure differential between the ambient atmosphere and the atmosphere beneath the membrane to effect the clamping of the substrate and dye carrier. This atmospheric clamping pressure may be effected by means of vacuum, air pressure, or a combination of the two.

In the embodiment under discussion, atmospheric clamping pressure 20 is attained by means of connecting at least one of a plurality of vacuum orifices 14 to a vacuum system 240, and thereby applying a vacuum, as shown at 18, to the underside of membrane 16. It should be noted that vacuum system 240 has been deleted from FIGS. 1A-B and D-H for purposes of illustrational clarity. Where a substantially perfect vacuum is obtainable at sea level, this theoretically results in a clamping force of approximately 14.7 psi over the entire surface of the dye carrier-substrate stack. Practically, a perfect vacuum is seldom obtainable and in any event is not generally necessary. Clamping forces equating to 14 psi resulting from less than perfect vacuum have been found to yield dye transfer images vastly superior to those obtainable by any other methodology. Depending upon the mechanical properties of the substrate, the dye transfer temperatures, and the nature of the thermal events occasioned by the application of the principles of the present invention, even lower clamping pressures may be utilized.

While the foregoing embodiment utilizes vacuum clamping, alternative embodiments utilize other means of attaining the very even clamping pressure afforded by vacuum clamping. These alternatives include, but are not necessarily limited to, the use of mechanical clamping pads incorporating a pressure-leveling layer, for instance foam rubber or sacrificial rigid foam sheets, and the use of air pressure clamps, for instance bag presses.

It should also be noted that clamping pressure, including the previously discussed vacuum clamping pressure, may serve as a processing control variable. For some imaging routines in some substrates, it may be advantageous to modify the clamping pressure above or below the nominal one atmosphere clamping pressure discussed above. Clamping pressures lower than one atmosphere may be attained and maintained by utilizing a vacuum regulator. Clamping pressures greater than one atmosphere may by attained by augmenting the vacuum clamping pressure with a supplementary clamping force. One methodology for attaining this latter option is by means of a bag press superimposed over the membrane; the inflated force of which bag press supplements the vacuum clamping attained by the membrane alone.

Figure 1D:
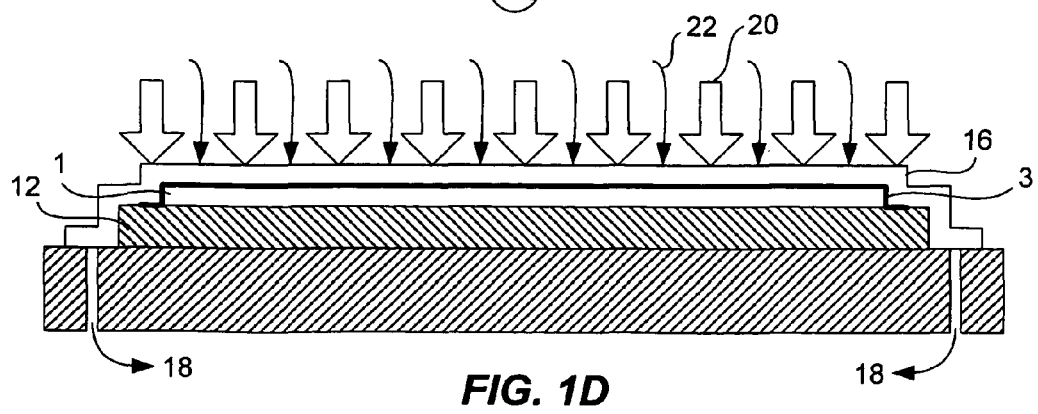

Referring now to FIG. 1D, a first, or heating thermal event for forming a dye sublimation image is imposed on the membrane-dye carrier-substrate stack as follows: thermal energy is applied through membrane 16 and dye carrier 3 to substrate 1. In this embodiment of the present invention, it has been found advantageous not only in terms of manufacturing efficiency, but of efficacy of later removing dye carrier 3 from substrate 1, that thermal energy 22 be provided as rapidly as possible to substrate 1. Thermal energy 22 may be applied through membrane 16 in substantially any manner known to those having ordinary skill in the art that will not damage membrane 16. The previously applied atmospheric clamping force is maintained throughout this step.

Examples of applicable heat transfer methodologies include, but are specifically not limited to: electrical resistance heating, for instance by means of electrical resistance wires embedded in membrane 16, or applied either above or below membrane 16; by the application of steam to an upper surface of membrane 16; by the application to an upper surface of membrane 16 of a flow of heated gas including steam, flame or heated fluid; or by the application of radiant energy to the top of membrane 16. Examples of such radiant energy include, but are not limited to, infrared energy applied by means of infrared lamps, or ultraviolet radiation, and microwave radiation. Another alternative for applying thermal energy 22 is the application to an upper surface of membrane 16 of a conductive heating source, for instance a heated plate. Again, this plate may be heated by any known heating methodologies, such as those previously discussed, as well as by introducing into a hollow interior of the plate a flow of heated fluid or gas.

Plastics, for instance thermoforming plastics, have specifically different physical attributes depending upon their internal temperature. At room temperature most commercially usable thermoforming plastics are substantially rigid, for instance as rigid sheets. At the other end of the temperature spectrum, heating a thermoforming plastic substantially above its forming temperature results in the substantial liquefaction of the plastic, with attendant destruction of the structure formed by the plastic as the plastic liquefies. Intermediate between these two extremes are temperatures at which the plastic begins to soften but is not yet fully liquid. It is at these intermediate temperatures that the dye sublimation process of the present invention is conducted.

In order to simultaneously render substrate 1 mechanically and chemically suitable for the introduction of dye, as well as to provide for the sublimation of imaging dyes from the solid to the vapor state, the temperature of the substrate, and hence the dye carrier, must be elevated beyond the plastic's rigid and generally impervious state to a state where the plastic begins to soften, and where the sublimation dyestuffs vaporize. In order to retain the structural integrity of the plastic, and to maintain the technical performance specifications of the plastic, it is necessary that it not be heated to the point where it liquefies. The ideal temperature is, of course, application specific and depends not only upon the type and thickness of plastic sheet to be imaged but also upon the nature of the imaging dyes.

The application of thermal energy 22 to raise the internal temperature of substrate 1 and dye carrier 3 comprises the first thermal event of the present invention. The duration of the first thermal event is again application specific and is determined empirically. One of the metrics for determining the duration of the first thermal event is the desired degree of penetration of the image into the plastic.

Figure 1E:
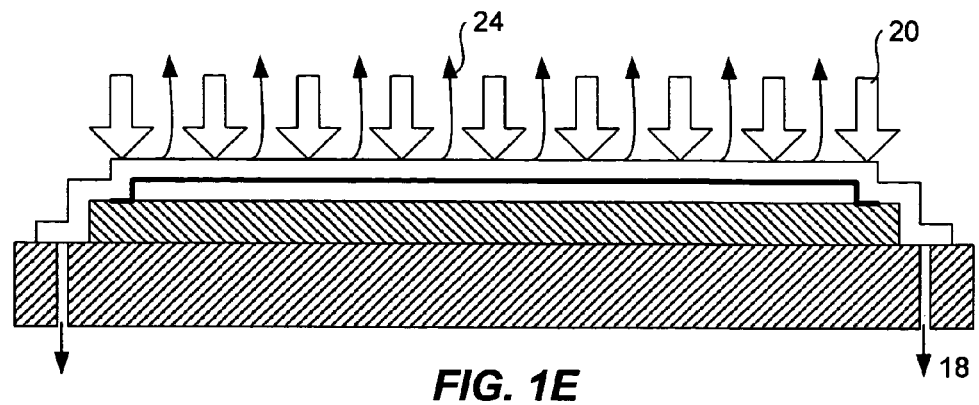

Referring now to FIG. 1E, following the first thermal event, which actually effects the dye sublimation imaging of the substrate 1, a second, or cooling thermal event is accomplished while the substrate and dye carrier remain under vacuum clamping pressure. Again, the previously applied vacuum 18 is maintained during this second thermal event that comprises the removal of thermal energy at 24. It has been found that a second, rapid cooling thermal event conducted under vacuum clamping pressure presents advantages over previous dye sublimation imaging technologies.

A first advantage accruing from this step is that the release of dye carrier 3 from substrate 1 is greatly improved over that of previous methodologies. Indeed, by carefully adjusting the temperature and duration of the first thermal event, in conjunction with the rapid cooling of the second thermal event, the unwanted adhesion of dye carrier 3 to substrate 1 has been completely obviated. While not wishing to be bound by theory, it is believed that the rapid cooling occasioned by the second thermal event introduces some thermal or mechanical shock between dye carrier 3 and substrate 1, which renders these two elements separable. This is accomplished without the need for special intermediate dye transfer webs or time-consuming pre-imaging conditioning processes required by other methodologies.

A second advantage afforded by this step relates to the previously discussed problems of unwanted distortion of the substrate caused by the heating and cooling thereof without benefit of a strong, evenly applied clamping force over the entire surface of the substrate. Again not wishing to be bound by theory, it is believed that prior dye sublimation technologies, by inducing the heating and cooling of the substrate, liberate internal forces within an unconstrained substrate which, on cooling, tend to twist, shrink, and warp the substrate. By utilizing an atmospheric clamping methodology including a tough, yet resilient membrane 16, for instance the vacuum clamping technology previously discussed, the present invention avoids this problem by forcing the retention of the substantially flat shape of the sheet throughout the several thermal events of the dye sublimation imaging process.

Figure 1F:
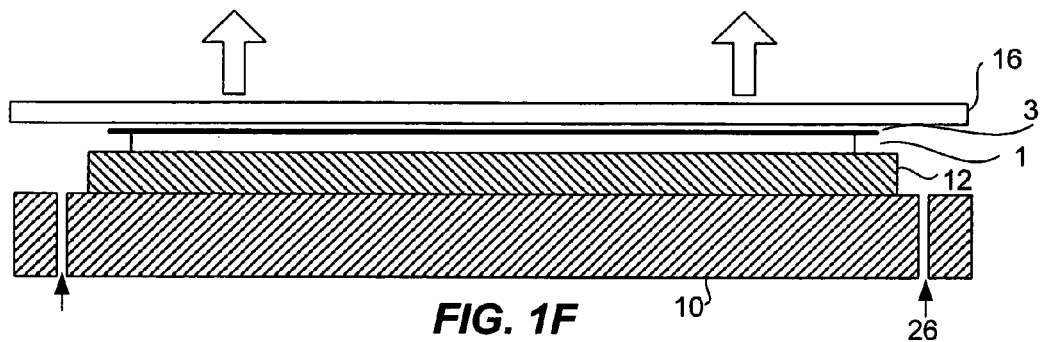
Figure 1G:
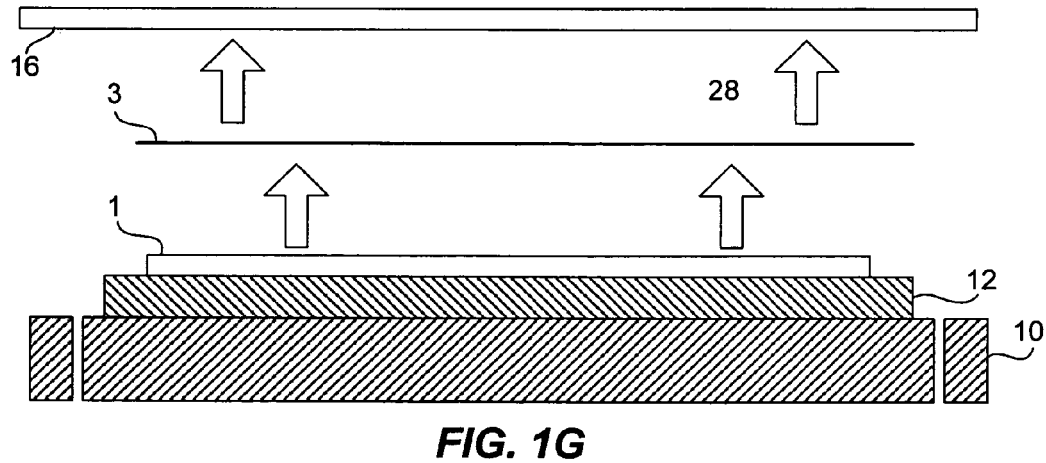
Figure 1H:
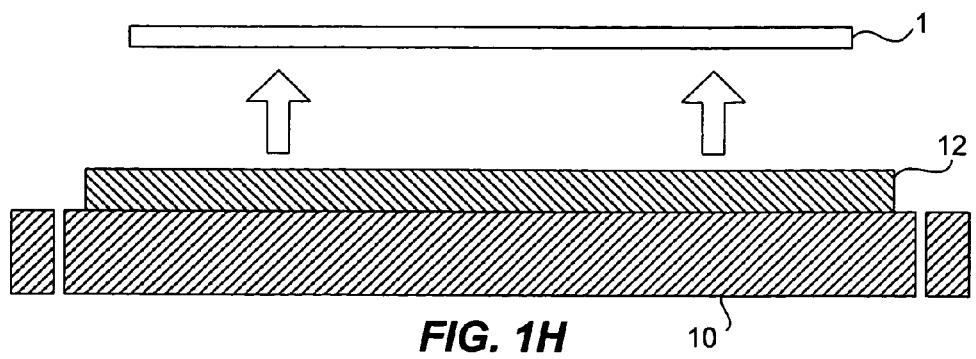

Referring now to FIGS. 1F-1H, at the completion of the second, cooling thermal event, vacuum is released at 26 and membrane 16 removed from the dye carrier-substrate stack at 28. Thereafter, dye carrier 3 and substrate 1 are lifted from passive cooling device 12. At this point, the image carried by dye carrier 3 has been formed within substrate 1. The degree of dye penetration within the plastic is dependent upon several factors. These include sublimation temperature, clamping pressure, and duration of application of thermal energy and clamping pressure.

A first apparatus for performing a methodology according to the present invention is disclosed having reference to FIGS. 2A-2C and 3. Dye transfer apparatus 200 includes a table assembly 202, at least one platen assembly 204, a thermal imaging unit 206, and a vacuum system 240. Table assembly 202 supports thermal imaging unit 206 and platen assembly 204. As will be discussed later, the utilization of a plurality of platen assemblies 204 presents advantages with respect to manufacturing efficiency. Accordingly, in one preferred embodiment of this apparatus, there are provided a pair of platen assemblies 204 and 204', which are substantially identical. Table assembly 202 is preferably equipped so that platen assemblies 204 and 204' may be introduced into thermal imaging unit 206 in rotation. In order to effect this insertion of platen assemblies 204 and 204', a system of rollers or slides may be implemented. These rollers are preferably formed as a series of rollers 220 on table assembly 202, across which platen assembly 204 and 204' slide. Alternatively, rollers or slides may be provided on the underside of platen assemblies 204 and 204'. Other sliding-friction reducing methods including air cushions, polished metal slides, and PTFE slides may, of course, be implemented.

Apparatus 200 is further equipped with a vacuum system 240. Vacuum system 240 includes a vacuum source, for instance a vacuum pump 242 and optionally a vacuum reservoir 244, which is connected by piping 245 to vacuum pump 242. This vacuum source is then connected by means of flexible piping 246 and vacuum valve 248 to platen assembly 204, and more particularly, to vacuum orifices 14 thereof. A similar set of piping and vacuum valves, 246' and 248', connects the vacuum source to platen assembly 204'. The actuation of vacuum valves 248 and 248' may be manual, remote, or automated. In a preferred embodiment of this apparatus, vacuum valves 248 and 248' are electrically controlled valves operated from a control station 300.

Figure 2A:
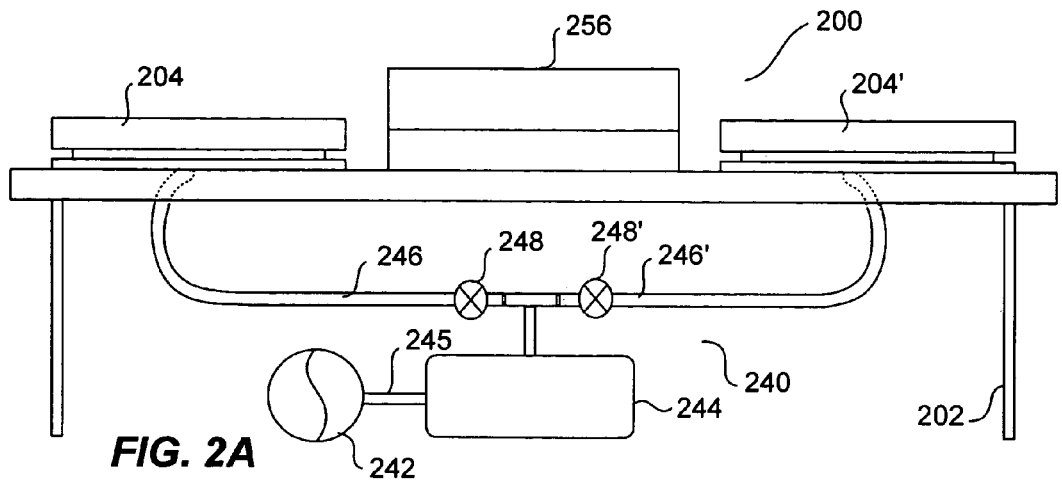
FIGS. 2A-C are frontal views of a first apparatus for performing the method of the present invention.
Figure 2B:
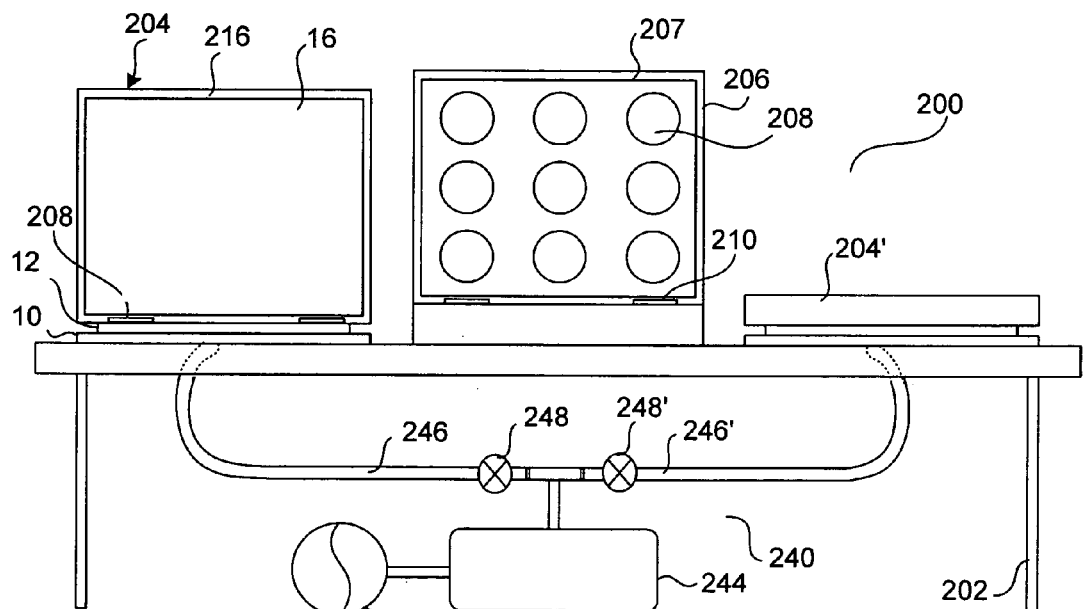

Referring now to FIG. 2B, details of thermal imaging unit 206 and platen assembly 204 are shown. Platen assembly 204 comprises a perforated aluminum platen 10, atop which is placed a passive cooling device 12. A frame, sometimes referred to herein as a "spectacle frame", 216 is hingedly attached at one side to platen 10 by means of hinges 208. Frame 216 has mounted thereto a sheet of elastomeric membrane 16, previously discussed, which membrane covers the aperture formed by the frame. In this embodiment of the present invention, membrane 16 takes the form of the textured sheet of DuPont Viton™.

Thermal imaging unit 206 in this embodiment is a substantially hollow box-like chassis 207 having mounted therein a heat source. This heat source may implement substantially any of the previously discussed heating methodologies, and in this embodiment of the present invention comprises at least one, and preferably a plurality of electrical infrared bulbs 209. Chassis 207 is hingedly attached to table assembly 202 by means of hinges 210 a suitable distance above the surface of table assembly 202 such that, when closed, thermal imaging unit 206 is positioned flushly atop platen assembly 204 when chassis 207 is lowered onto platen assembly 204.

Figure 2C:
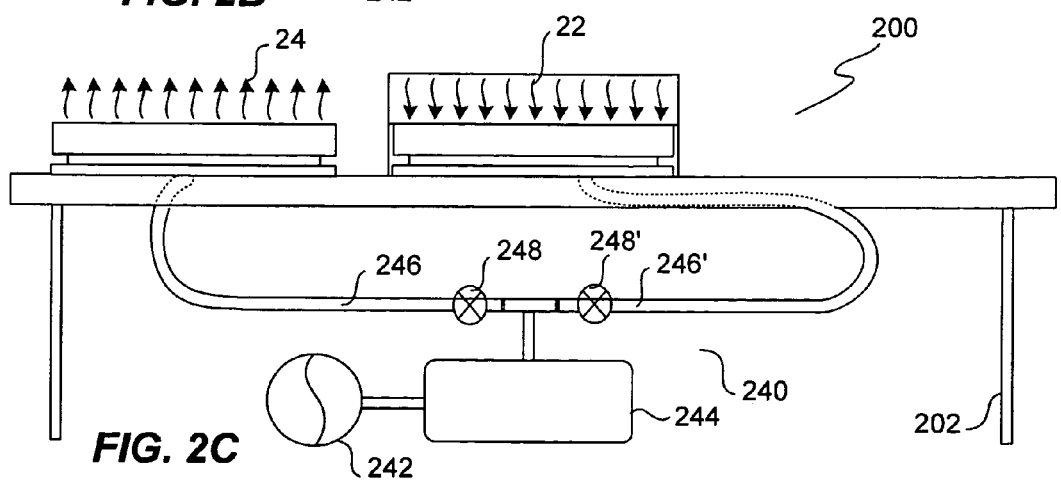
Figure 3:
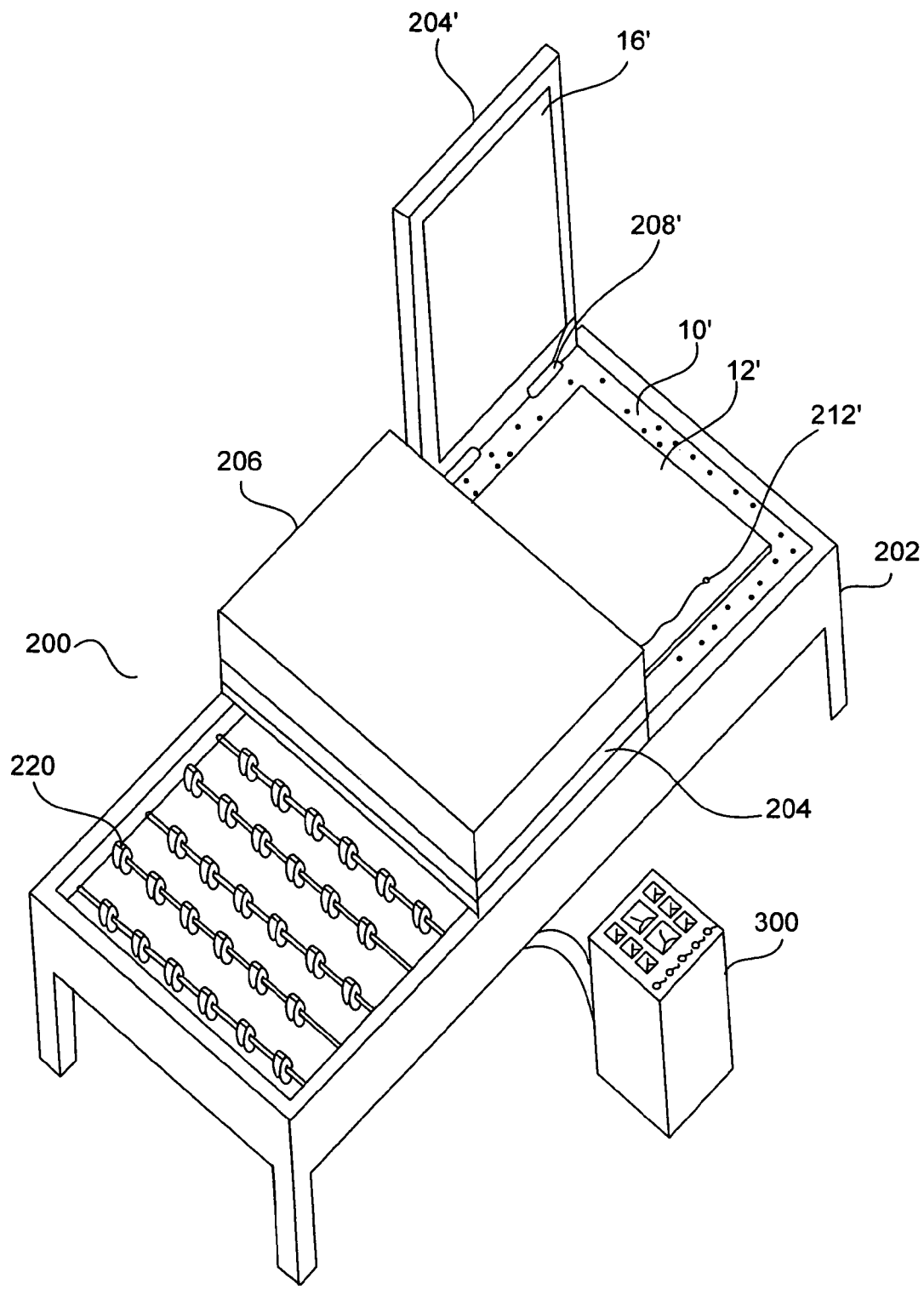
FIG. 3 is a perspective view of the first apparatus for performing the method of the present invention.

The operation of apparatus 200 is further described having reference to FIGS. 2B-C. At the start of one imaging cycle, frame 216 is opened as shown at the left side of FIG. 2B, and a sheet of plastic substrate 1 is inserted atop cooling device 12. Thereafter, a dye carrier 3 having a dye image 5 imprinted thereon is positioned such that dye image 5 is in direct contact with substrate 1. Dye image 5 may be advantageously formed by imprinting the image, utilizing substantially any known dye sublimation dyestuff, onto one surface of dye carrier 3. Thereafter, frame 216 is closed over the dye carrier-substrate-cooling device stack substantially as shown at the right side of FIG. 2B. Thereafter, vacuum valve 248 is opened, causing vacuum system 240 to evacuate the area under membrane 16. This evacuation seals membrane 16 to platen 10 and the previously discussed stack, and provides an atmospheric clamping force to effect the dye transfer process. It also acts to maintain the registration of the dye carrier 3 with respect to substrate 1, and in novel fashion to preclude the unwanted distortion of substrate 1, as previously discussed.

Once suitable vacuum clamping force has been obtained, platen assembly 204 is slidably positioned beneath chassis 207 of thermal imaging unit 206, and chassis 207 is positioned on top of platen assembly 204. It should be noted that the hinged elevation and lowering of both chassis 207 of thermal imaging unit 206, and frame 216 of platen assembly 204, may be manually performed, or advantageously may be performed by any lifting methodology known to those having skill in the art. These lifting methodologies include, but are specifically not limited to, pneumatic cylinders, hydraulic cylinders, servo motors, spring devices, counter weights, screw or geared devices and all other elevating and depression methodologies known to those having ordinary skill in the art.

After chassis 207 is lowered onto platen assembly 204, infrared bulbs 209 are energized causing the heating 22 of membrane 16, dye carrier 3 and substrate 1, while dye carrier 3 and substrate 1 remain under the previously discussed clamping vacuum. The temperature beneath membrane 16 may be monitored by means of a thermocouple 212 positioned between passive cooling device 12 and membrane 16. Alternative temperature monitoring methodologies known to those of ordinary skill in the art may, of course, be implemented. Infrared bulbs 209 remain energized for a specified time empirically determined to be optimal for the substrate, sublimation dyestuff, and degree of dye transfer imaging desired.

Once the specified thermal imaging time has elapsed, infrared bulbs 209 may be de-energized, chassis 207 is elevated, and platen assembly 204 is removed from under chassis 207 while a vacuum is retained under membrane 16. The advantages of an embodiment of this apparatus having two platen assemblies 204 and 204' are now shown. While platen assembly 204 is cooled under vacuum clamping at 24, platen assembly 204', having been previously loaded and vacuum clamped, is positioned under chassis 207 of thermal imaging unit 206. Chassis 207 is then lowered onto frame 216 of platen assembly 204' and the heat source, for instance infrared bulbs 209, may again be energized. Accordingly, one of platen assemblies 204 and 204' is cooling while the other is heating, while both retain their respective substrate/dye carrier stacks under clamping pressure.

In this embodiment of the present invention, which implements a passive cooling device, cooling 24 is accomplished by exposing platen assembly 204 to ambient air temperature. This exposure may be augmented by introducing a flow of ambient air across the surface of platen assembly 204, and most especially across membrane 16 by means of a fan or other airflow-inducing device. Passive cooling device 12 serves to passively cool substrate 1, dye carrier 3 and at least a portion of membrane 16 in the following manner: being of very low thermal mass, passive cooling device retains little unwanted heat. Once the first thermal event is complete, and the second thermal event commenced, passive cooling device 12, contributing little additional overhead, enables the rapid cooling of the membrane and the elements under it.

Again, the temperature beneath membrane 16 is monitored by means of thermocouple 212 until substrate 1 has reached a temperature sufficiently cool to return it to its rigid state without distortion. Thereafter, vacuum valve 248 is actuated to relieve the vacuum beneath membrane 16, thereby releasing the clamping pressure to substrate 1 and dye carrier 3. Once clamping pressure is released, substrate 1 and dye carrier 3 may be removed from platen assembly 204 after lifting frame 216 therefrom. By using two platen assemblies, for instance 204 and 204', to alternatively heat and cool the substrate in this manner, imaging throughput is nearly doubled.

In one application of this embodiment of the present invention, an 80 mil acrylic sheet was utilized as substrate 1. The acrylic sheet was imaged by positioning it on passive cooling device 12, and then superimposing a dye carrier 3 thereover, as shown. Spectacle frame 216 was then lowered over the acrylic sheet and dye carrier 3, covering them with membrane 16. In this embodiment, a silicone rubber sheet was implemented as membrane 16. After evacuation of the space under membrane 16, processing proceeds as previously discussed for this embodiment. In this case, the acrylic sheet was processed for 10 minutes at a temperature of 350° F. After this first thermal event, cooling proceeded as previously discussed.

Where one embodiment of the present invention utilizes radiant heating, as previously discussed, another embodiment utilizes conductive heating. An example of such a conductive apparatus is shown having reference to FIGS. 4A-4C and 6. This embodiment shares many characteristics of the previously discussed apparatus, but with one significant difference: where the previously discussed apparatus used radiant heating, this embodiment utilizes a conductive heating plate 402. Table 202 and vacuum system 240 are as before, as are platen assemblies 204 and 204'. In this embodiment, however, thermal imaging unit 400 defines a lateral tunnel 450 therethrough.

Conductive heating plate 402 is retractably mounted within a portion of thermal imaging unit 400 overlying tunnel 450. Conductive heating plate 402 in this embodiment is typically retracted upwardly by means of a retractor, in this embodiment, one or more tension springs 406. Alternative retraction devices known to those having ordinary skill in the art, including but not limited to counterweights, pneumatic cylinders, vacuum cylinders, chains, bag presses, cables, hydraulic cylinders, and electromechanical devices may, with equal facility, be implemented.

Positioned between an upper surface 403 of conductive heating plate 402 and an inner surface 401 of thermal imaging unit 400 is a clamping or urging device, which works in opposition to tension springs 406 to urge conductive heating plate 402 into contact with membrane 16. In the embodiment here illustrated, this urging device takes the form of a bag press 404. Bag press 404 is connected to a controllable source of pressurized gas, or air by means of piping and valves, not shown in this figure, to effect the urging of heating plate 402 into contact with membrane 16. Of course, alternative clamping or urging devices known to those of ordinary skill in the art may also be implemented to fulfill this function. Non-limiting examples of such include hydraulic cylinders, pneumatic cylinders, magnetic urging devices including electromagnetic urging devices, camshafts, crankshafts, wedges, and other methodologies for imparting substantially linear motion known to those of ordinary skill in the art.

Figure 4A:
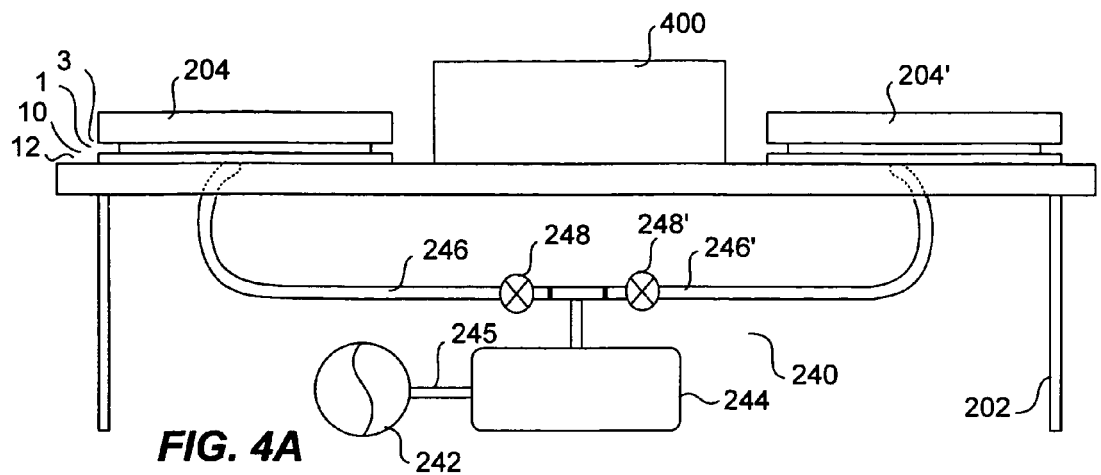
FIGS. 4A-C are frontal views of a second apparatus for performing the present invention.
Figure 4B:
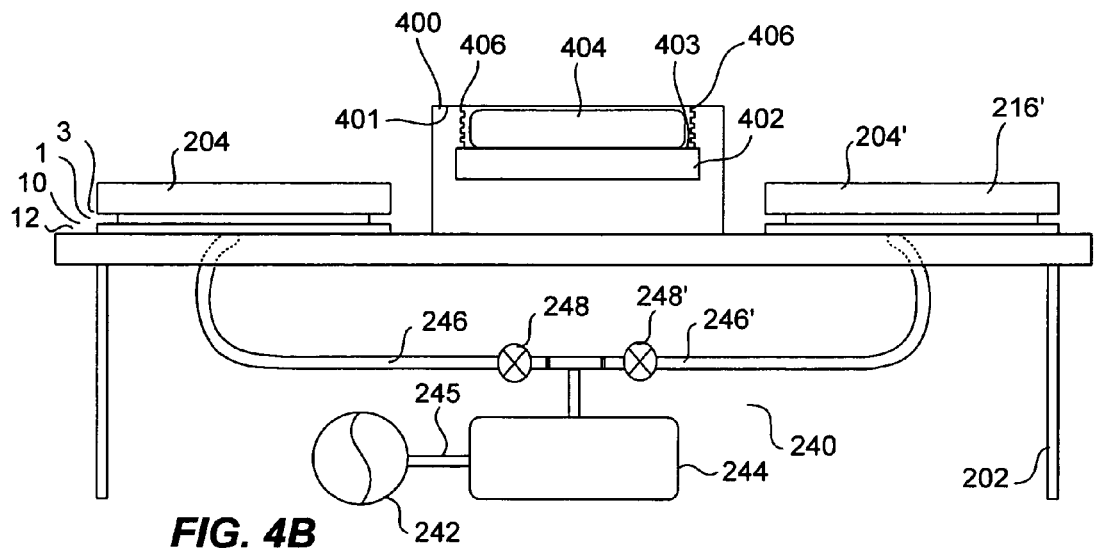
Figure 4C:
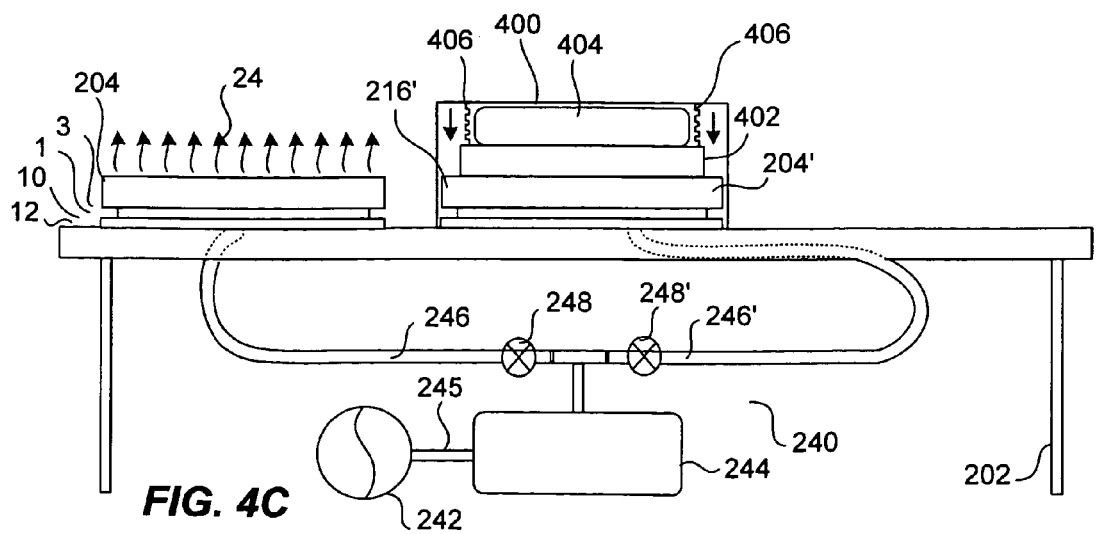
Figure 5A:
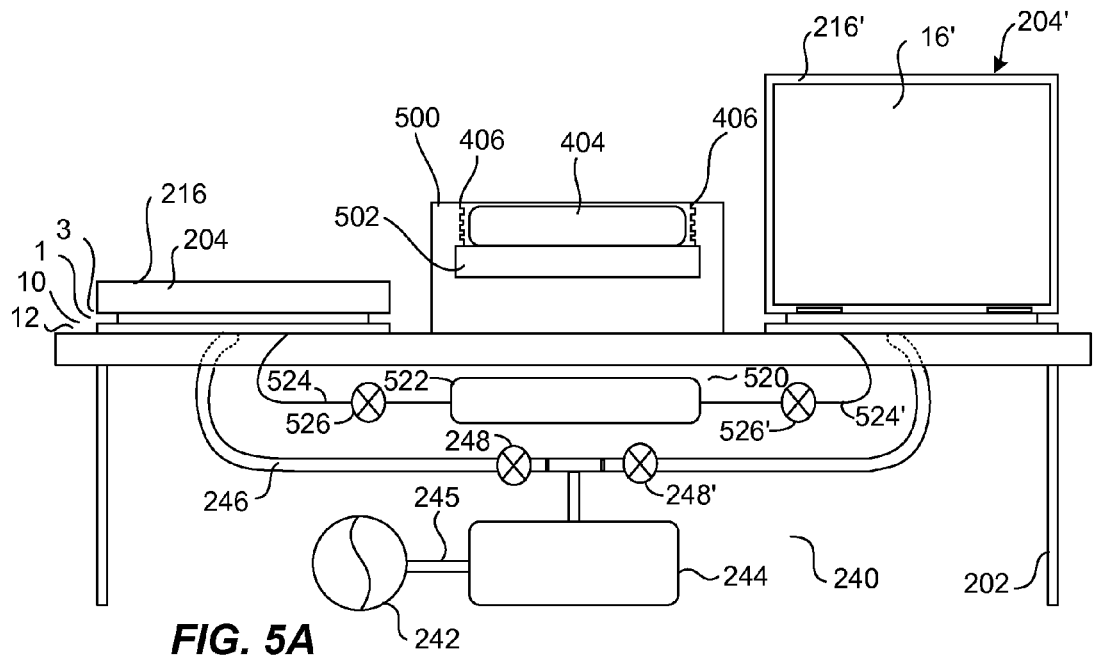
FIGS. 5A-B are frontal views of a third apparatus for performing the present invention.
Figure 5B:
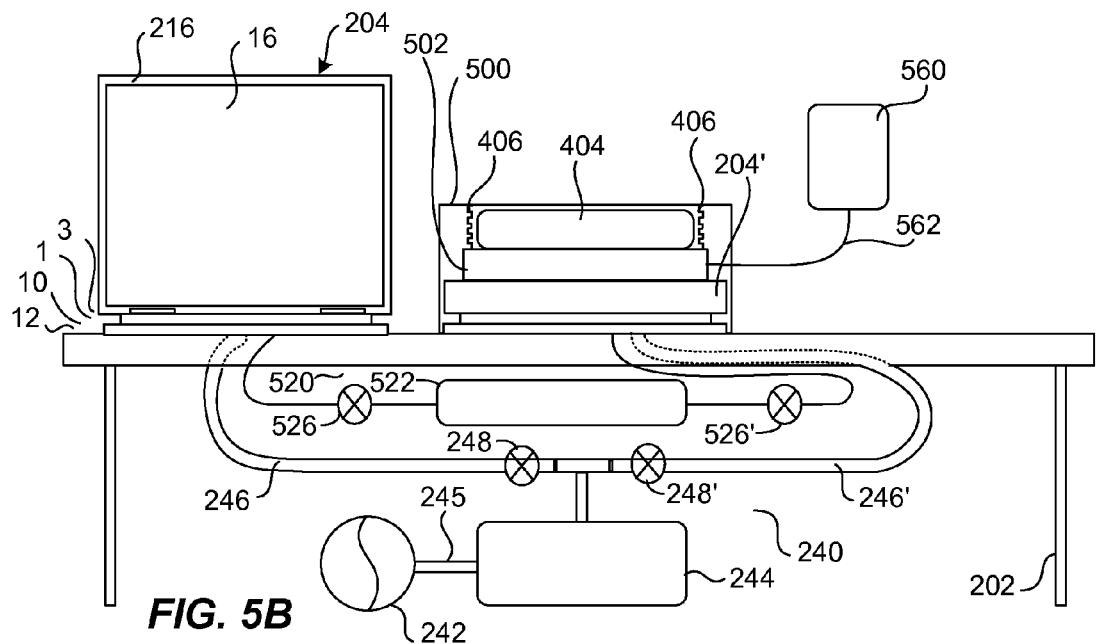
Figure 6:
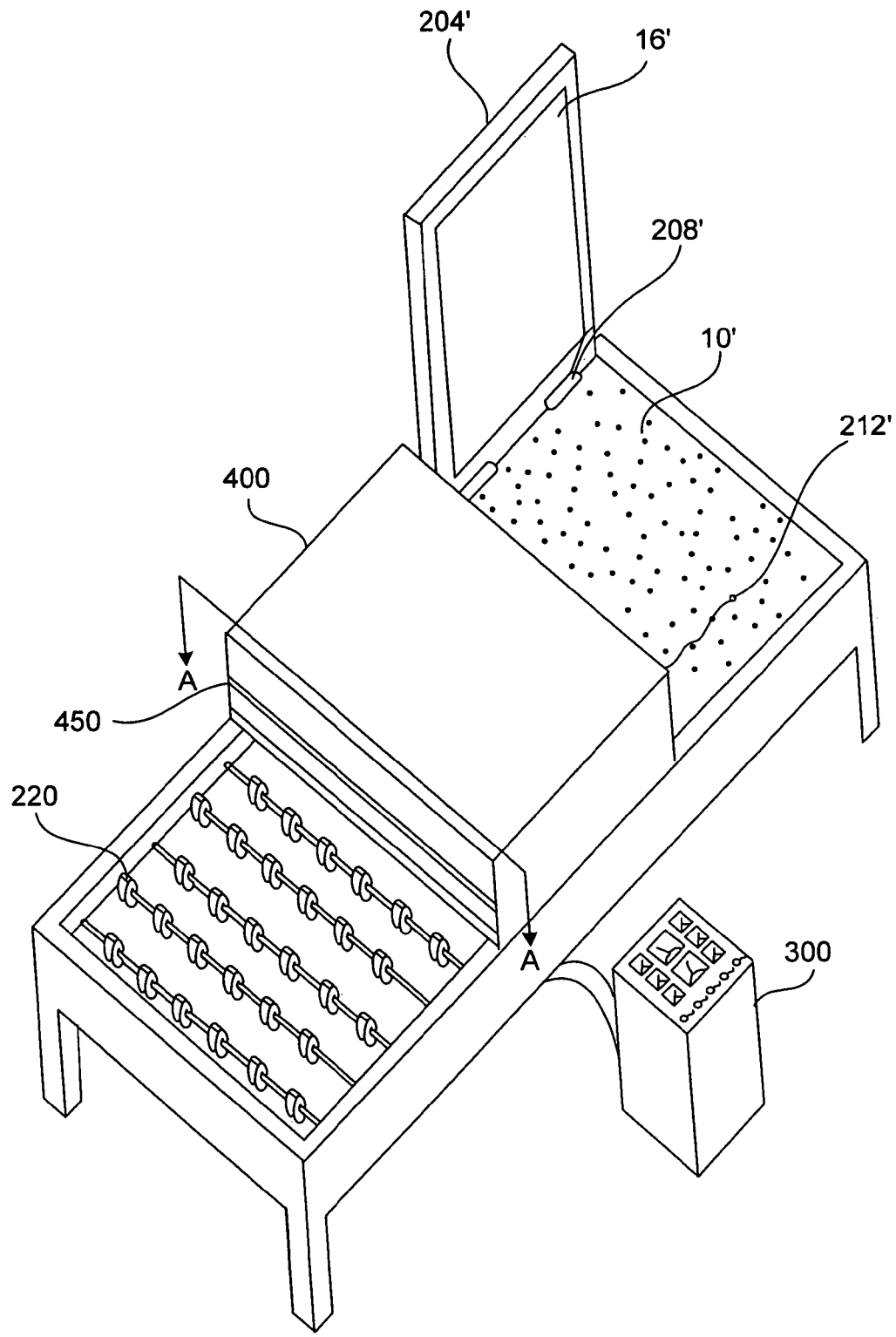
FIG. 6 is a perspective view of the second and third apparatuses for performing the method of the present invention.
Figure 7:
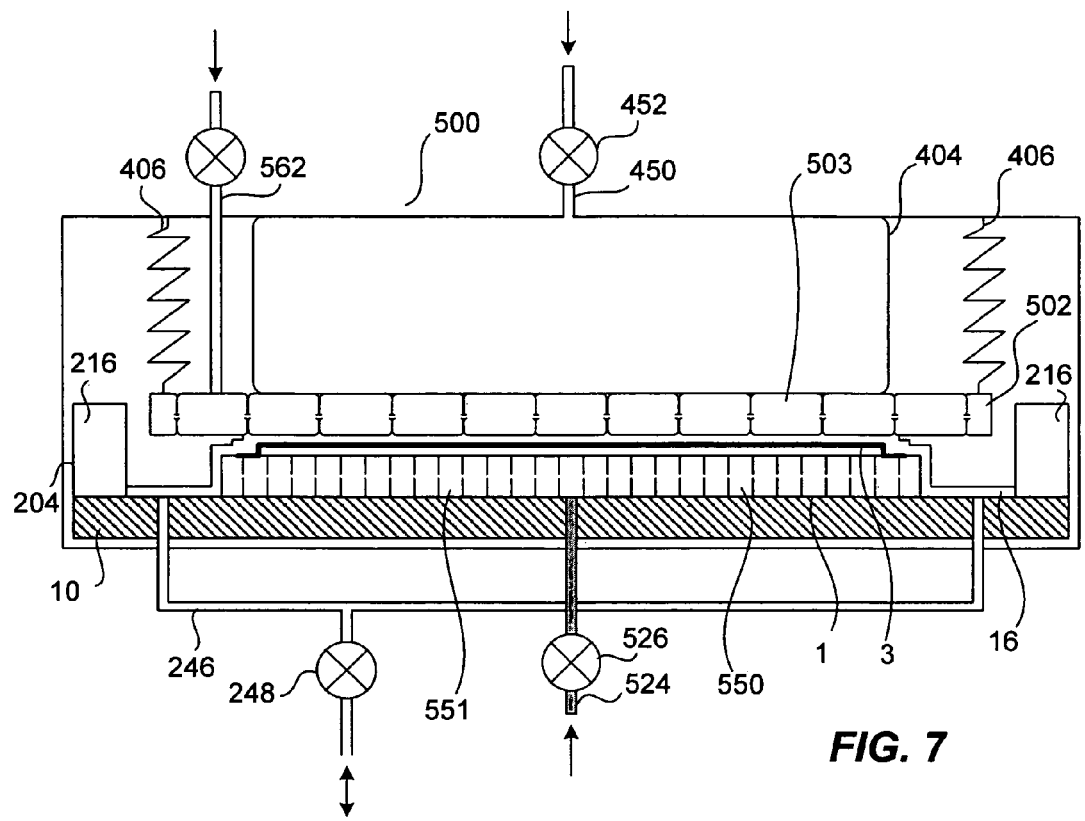
FIG. 7 is a cross-section through a thermal head according to one embodiment of the present invention employing an active cooling device.
Figure 10:
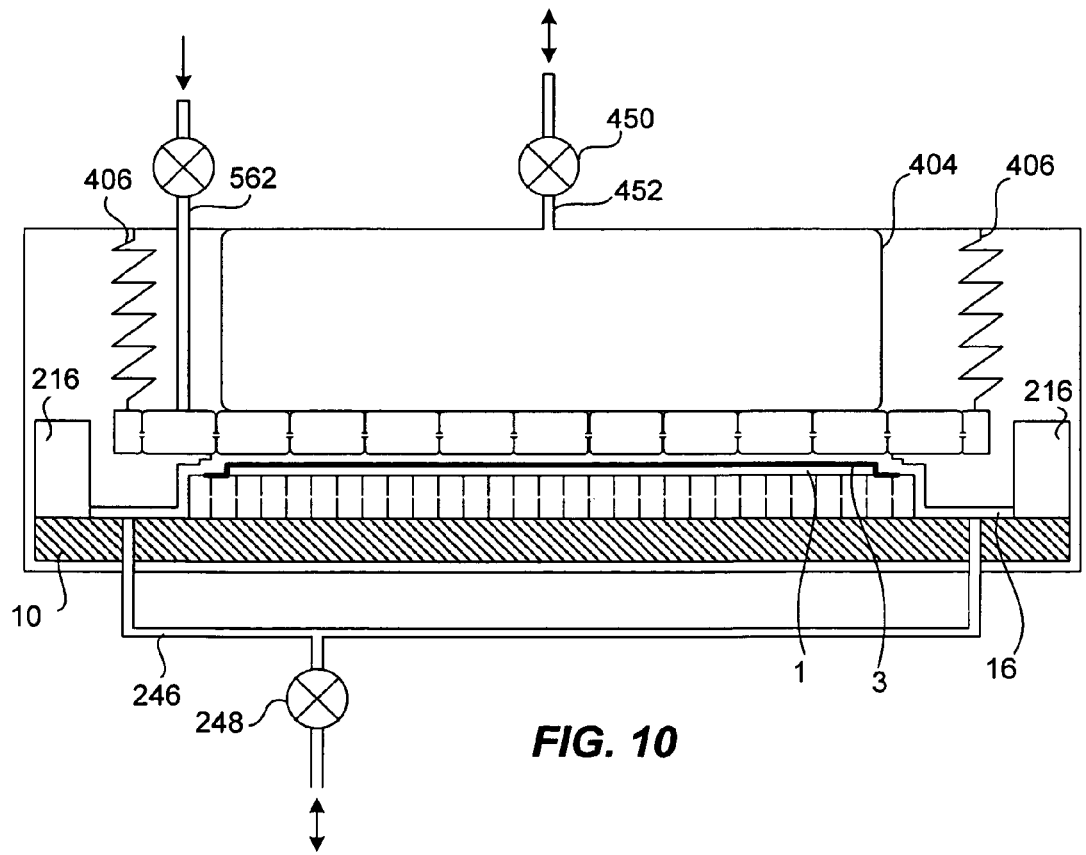
FIG. 10 is a cross-section through a thermal head according to one embodiment of the present invention employing a passive cooling device.

Referring now to FIGS. 4B-4C and 10, which depict a cut-away section through thermal imaging unit 400, the operation of this embodiment is explained. At FIG. 4A, platen assembly 204 has just been removed from thermal imaging unit 400. Platen assembly 204' has been loaded with substrate 1 and dye carrier 3, as before. At this point, both platen assemblies 204 and 204' are retained under vacuum clamping pressure by means of vacuum valves 248 and 248' being opened to vacuum system 240. It will be appreciated that conductive heating plate 402 has been retracted upwardly by means of tension springs 406, rendering platen assembly 204' slidably insertable into thermal imaging unit 400 by means of tunnel 450.

Conductive heating plate 402 may be heated by any means known to those having ordinary skill in the art including, but not limited to: electrical resistance wiring; the introduction of heated gases or fluids into a hollow interior portion 403 of conductive heating plate 402; radiant or convective heating of the conductive heating plate; open flame including one or more gas jets, as well as substantially any other methodology of controllably heating a conductive metal plate. In the embodiment depicted in the referenced figures, conductive heating plate 402 takes the form of a flat aluminum plate rendered partially hollow by the formation therein of at least one labyrinthine passage. In the embodiment depicted in this figure, conductive heating plate 402 is connected by means of piping and valves to an oil heater, including an oil circulation pump. The oil heater thus provides a controllable flow of heated oil through the interior labyrinth of conductive heating plate 402 when it is desired to heat the plate. The flow of heated oil may be thermostatically controlled by a hot oil valve and hot oil piping 562 to retain conductive heating plate 402 at a desired temperature, or within a desired temperature range.

At FIG. 4C, platen assembly 204' has been slidably inserted through tunnel 450 into thermal imaging unit 400, and conductive heating plate 402 urged into close contact with an upper surface of membrane 16' by means of bag press 404. This urging is accomplished by introducing a controlled flow of compressed gas, or air, into an interior portion of bag press 404 by means of compressed air valve 452 and compressed air piping 450. Conductive heating plate 402, being heated to a temperature sufficient to induce the desired sublimation temperature in substrate 1 and dye carrier 3, effects that heating of the substrate through membrane 16 for the desired period of time. While this first thermal event is conducted in this fashion, platen assembly 204, having previously been removed from thermal imaging unit 400, is cooled as previously discussed, at 24.

Bag press 404 may also be used to increase the clamping pressure delivered to dye carrier 3 and substrate 1 above the nominal one atmosphere clamping pressure attainable by means of vacuum clamping alone. In one embodiment of the present invention, it is contemplated that the auxiliary clamping force attained by pressurizing the bag press may contribute as much as an additional 20 atmospheres of clamping pressure, where the substrate/sublimation dye combination warrants such elevated clamping pressures.

Once the temperature of substrate 1 has been elevated to the desired degree for the desired period of time, pressure within bag press 404 is relieved, again by means of compressed air valve 452 and compressed air piping 450. Conductive heating plate 402 is then retracted to the position shown at FIG. 4B by means of tension springs 406. Thereafter, platen assembly 204' is removed from thermal imaging unit 400 to the position shown at FIG. 4A, and platen assembly 204, having been re-loaded following the cooling of its previously imprinted substrate, is ready for insertion into thermal imaging unit 400.

In one application of this embodiment of the present invention, an 80 mil Sintra® sheet was utilized as substrate 1. The Sintra® sheet was imaged by positioning it on passive cooling device 12, and then superimposing a dye carrier 3 thereover, as shown. Spectacle frame 216 is then lowered over the Sintra® sheet and dye carrier 3, covering them with membrane 16. In this embodiment, a Viton® fluoroelastomer sheet was implemented as membrane 16. After evacuation of the space under membrane 16, processing proceeds as previously discussed for this embodiment. In this case, the Sintra® sheet was processed for 5-7 minutes at a temperature of 285° F. Following this first thermal event, cooling proceeded as previously discussed.

While the embodiments of the present invention previously disclosed utilize a system of rollers, for instance 220, in order to render platen assemblies 204 slidably positionable under the thermal imaging head, the principles of the present invention contemplate alternative methodologies for positioning platen assemblies 204 and 204' under thermal imaging unit 400. These methods include, but are not limited to, forcing one or more platen assemblies 204 vertically into position with respect to thermal imaging unit 400, and rotatably positioning such platen assemblies 204 below thermal imaging unit 400. Moreover, while platen assemblies 204 may be manually slid into position with respect to thermal imaging unit 400, the principles of the present invention further contemplate the use of a positioning member, not shown, to effect the slidable positioning of platen assembly 204. Examples of such positioning members include, but are again not limited to, pneumatic cylinders, hydraulic cylinders, gears, screw drives, gear drives, cables, chains, electrical coils, electromechanical devices, and other positioning methodologies well-known to those having ordinary skill in the art.

Referring now to FIGS. 5A-5B, 6, and 7, a further embodiment of the present invention implementing an active cooling system is disclosed. Again, table 202, thermal imaging unit 400, and vacuum system 240 are substantially as previously disclosed. This embodiment, however, introduces an active cooling element 550 in place of the previously discussed passive cooling device 12. According to one embodiment of the present invention, active cooling element 550 comprises a thermally conductive flat plate, for instance an aluminum plate, defining therein at least one internal cavity 551, which is connected to a cooling system 520. Cooling system 520 comprises piping 524 and valves 526 connecting active coolant element 550 to a cooling source 522.

Cooling source 522 may employ substantially any cooling or refrigeration methodology known to those having ordinary skill in the art. By way of illustration, but not limitation, such refrigeration methodologies include, but are not limited to, the flow of refrigerated liquids and gases, the introduction into cavity 551 of a flow of super-cooled liquid, for instance liquid nitrogen, and the induction by means of a small orifice from cavity 551 of an expanding flow of gas, resulting in the cooling of element 550.

The implementation of the methodology taught herein is conducted utilizing this embodiment as follows: once platen assembly 204 has been introduced into thermal imaging unit 500 and aligned with respect to conductive heating element 502, a flow of compressed gas, for instance air, is introduced through valve 452 and pressure piping 450 into the interior of bag press 404, inflating bag press 404 and urging conductive heating element 502 downward into intimate contact with membrane 16. Conductive heating element 502 is retained in intimate contact with membrane 16 by maintaining pressure within bag press 404. This pressure may be maintained or regulated by means of a pressure regulator, not shown.

Conductive heating element 502 is heated, in this embodiment, by means of a controlled flow of heated oil from oil heater 560 introduced into an interior portion 503 of conductive heating element 502 through heating oil piping 562. The flow of heated oil is controlled by means of a hot oil valve. An oil return line, not shown, returns cooled oil from conductive heating element 502 to oil heater 560. Thermocouple 212 measures the temperature under membrane 16.

Once the temperature under membrane 16 has reached the desired sublimation temperature, it is maintained at that temperature by means of a continuing flow of heated oil for the duration of the first, or heating, thermal event. Thereafter, pressure is released from bag press 404 by means of valve 452, and tension springs 406 retract conductive heating element 502 upwardly, compressing bag press 404. A controlled flow of chilled water is then introduced into an interior cavity 551 of active cooling plate 550 by means of chilled water piping 524 and chilled water valve 526 from cooling source 522 to effect the second, or rapid cooling, thermal event. A water return line, not shown, returns warmed water to cooling source 522 for re-cooling. Again, the temperature of substrate 1 is measured by thermocouple 212, and when substrate 1 has been returned to its substantially rigid state, the flow of chilled water into active cooling plate 550 is secured by means of chilled water valve 526. This concludes the second, or cooling, thermal event.

At this point, platen assembly 204 is slidably retracted from thermal imaging unit 500 through tunnel 450 and the vacuum, which has been maintaining clamping pressure on substrate 1 and dye carrier 3, is released by means of vacuum valve 248 and vacuum piping 246. Thereafter, frame 216 is lifted from platen 10 and both dye carrier 3 and substrate 1, now bearing the desired image, are removed from atop active cooling plate 550. Thereafter, platen assembly 204' may be introduced into thermal imaging unit 500 and processing repeated as described above. Platen assembly 204 may be advantageously re-loaded with another blank substrate 1 and dye carrier 3, and platen assembly 204 may then be readied for insertion into thermal imaging unit 500 following the previously discussed vacuum clamping process.

Figure 8:
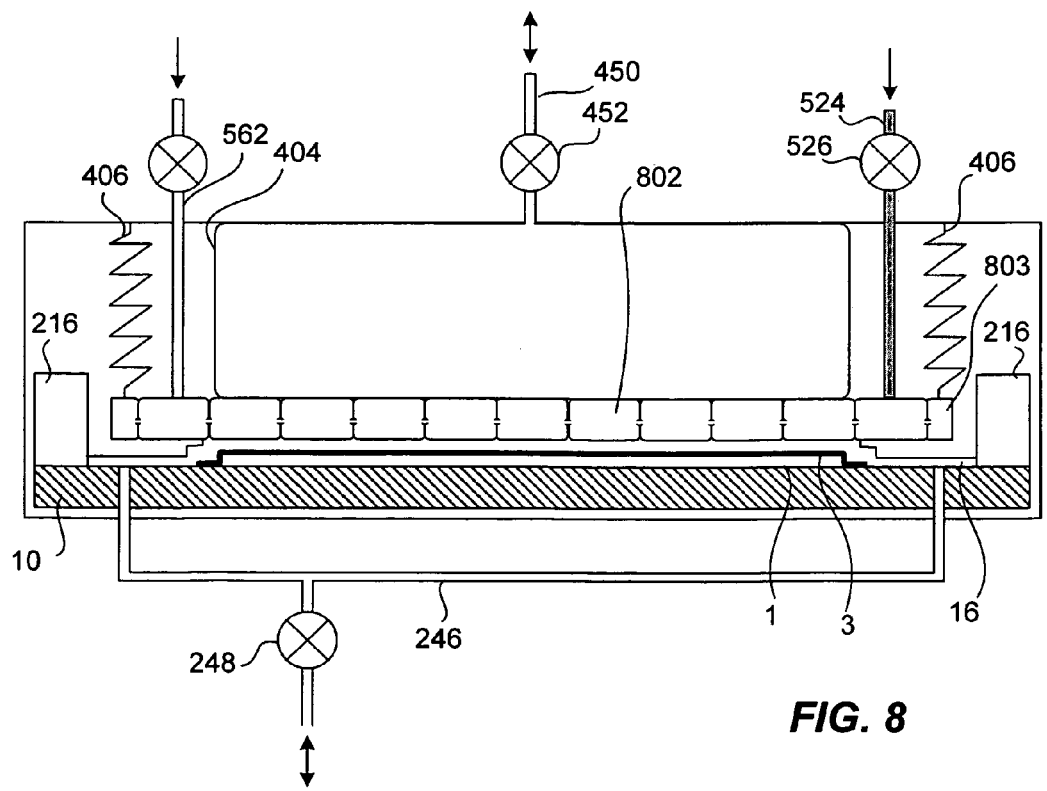
FIG. 8 is a cross-section through a thermal head according to another embodiment of the present invention employing an alternative active cooling device.

Yet another alternative is presented having reference to FIG. 8. This embodiment is similar to the embodiment depicted in FIG. 7, but with this difference: active cooling plate 550 is not utilized in the present environment, but both heating and active cooling are performed by means of a thermal plate 802. Thermal plate 802 is similar to conductive heating plate 502 shown in FIG. 7 with the exception that it provides both heating and active cooling to substrate 1 and dye carrier 3 through membrane 16. This is accomplished in the following manner: to effect the heating of thermal plate 802, there is introduced into an internal cavity 803 thereof a controlled flow of heated fluid, for instance a 50 percent mixture of ethylene glycol and water, this mixture sometimes hereafter referred to as "water", by means of hot water piping 804 controlled by hot water valve 806.

This heated fluid may be heated in a furnace, boiler, or other fluid heating means known to those having ordinary skill in the art. Moreover, in order to attain substantially elevated temperatures without boiling this heated fluid, the principles of the present invention contemplate raising the pressure within the heating system to prevent the heated fluid from boiling. Processing proceeds as previously described until the desired duration of the first thermal event has been reached. At this point, the flow of hot water through hot water piping 804 is secured at hot water valve 806. Thereafter, a flow of coolant, for instance chilled water, which in this embodiment will be understood to include the previously discussed mixture of water and ethylene glycol, is then introduced into the internal cavity 803 of thermal plate 802 by means of chilled water piping 524 controlled by chilled water valve 526. This has the effect of rapidly cooling thermal plate 802 and transforming that unit into a cooling plate. Once again, cooling is applied to substrate 1 and dye carrier 3, now by chilled thermal plate 802, until such time as substrate 1 has been returned to its substantially rigid state. Thereafter, processing proceeds as previously described.

In one application of this embodiment of the present invention, a 60 mil Kydex® sheet was utilized as substrate 1. The Kydex® sheet was imaged by positioning it on platen 10, and then superposing a dye carrier 3 thereover, as shown. Spectacle frame 216 is then lowered over the Kydex® sheet and dye carrier 3, covering them with membrane 16. In this embodiment, a butyl rubber-covered canvas sheet was implemented as membrane 16. After evacuation of the space under membrane 16, processing proceeds as previously discussed for this embodiment. In this case, the Kydex® sheet was processed for 5 to 10 minutes at temperatures from 335° F. to 370° F. Following the first thermal event, a flow of chilled fluid was introduced into the interior 803 of thermal plate 802 to cool the Kydex® sheet, substantially to room temperature.

An alternative to this embodiment contemplates the utilization of separate heating and cooling plates, either in the same thermal imaging unit, or in separate heating and cooling units. These units could be substantially identical, with the sole difference being the type of plate, either heating or cooling, employed therein.

Figure 9:
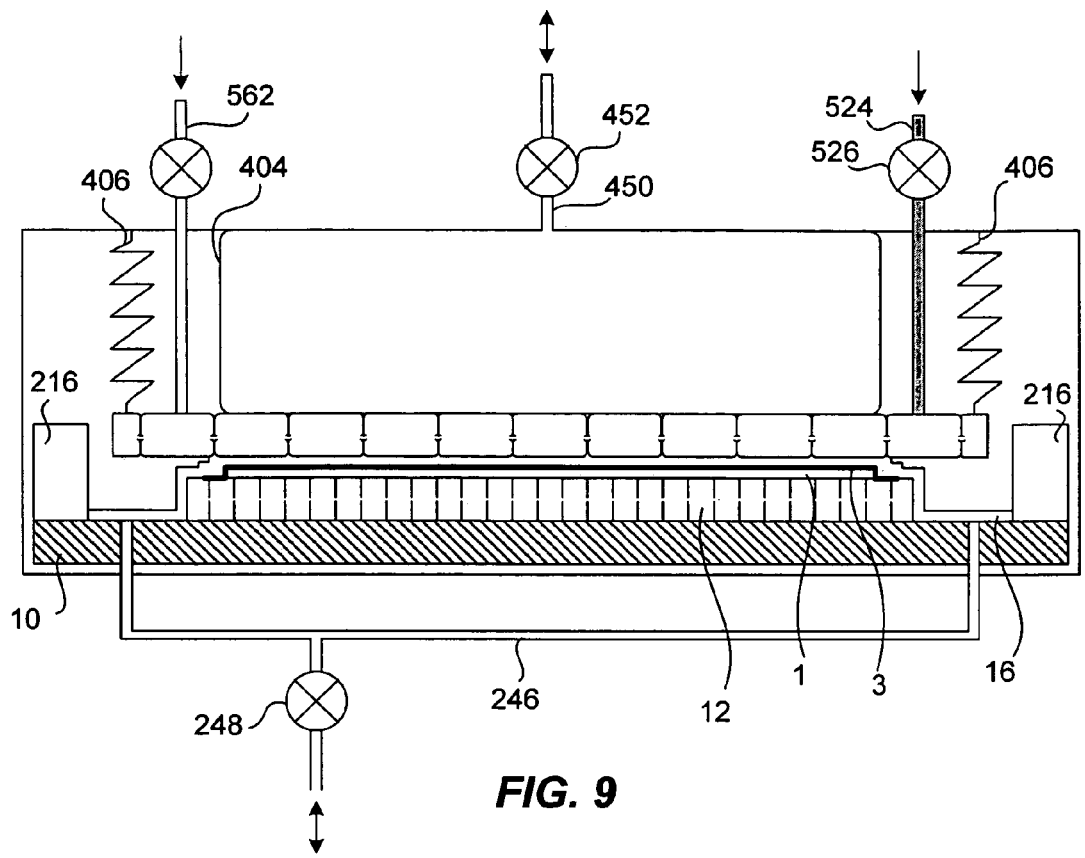
FIG. 9 is a cross-section through a thermal head according to another embodiment of the present invention employing both active and passive cooling devices.

Still another embodiment is shown having reference to FIG. 9. The apparatus shown in FIG. 9 is substantially identical with that described above and shown in FIG. 8, with the addition of passive cooling device 12. Accordingly, it will be appreciated that this embodiment employs both active and passive cooling. The utilization of a passive cooling device 12 in addition to thermal plate 802 has the advantage that any unwanted heat transferred by the first thermal event into platen 10 is minimized by the utilization of passive cooling device 12.

Figure 11:
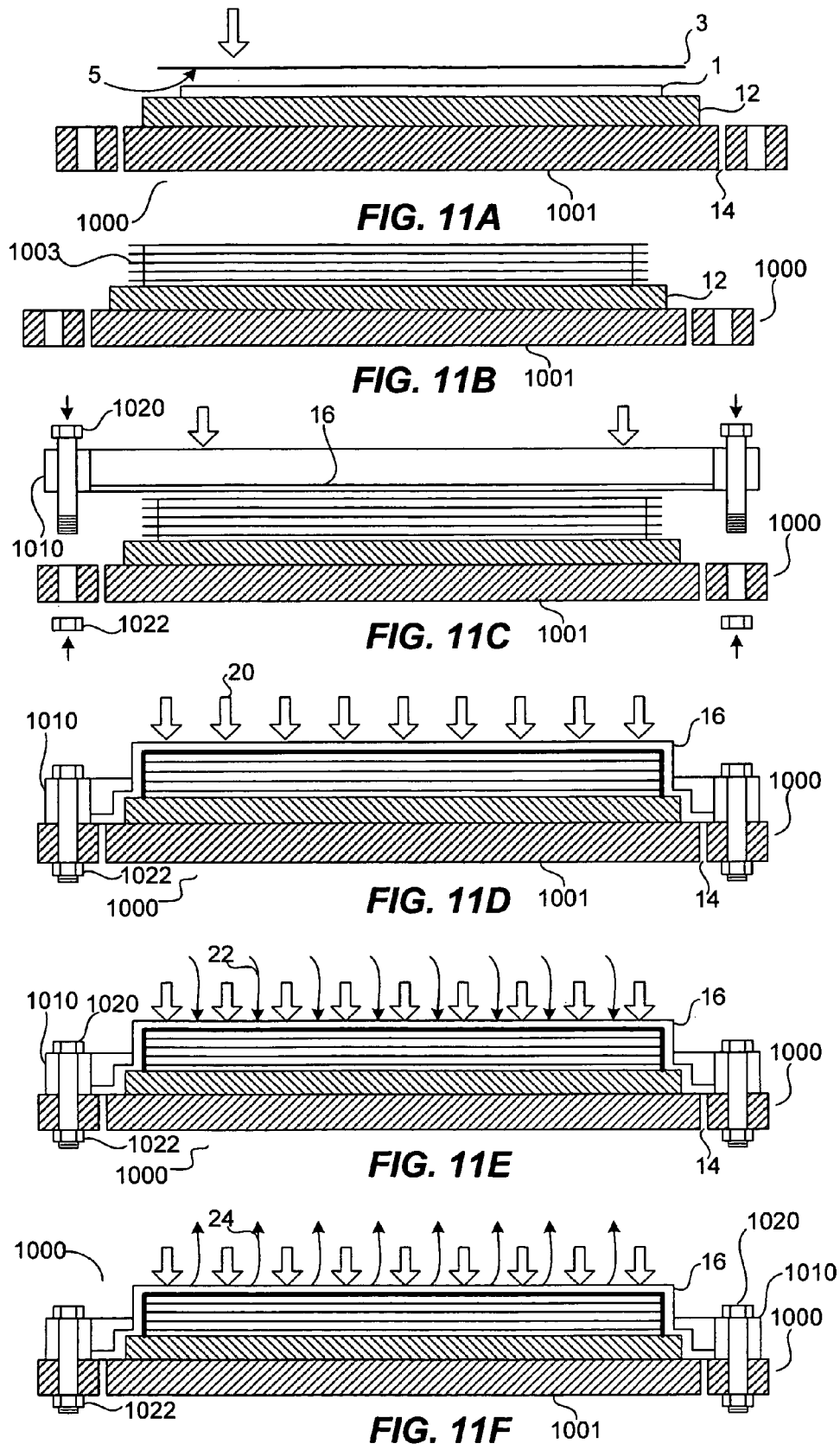
FIGS. 11A-F are cross-sections taken through an alternative platen assembly.
Figure 12:
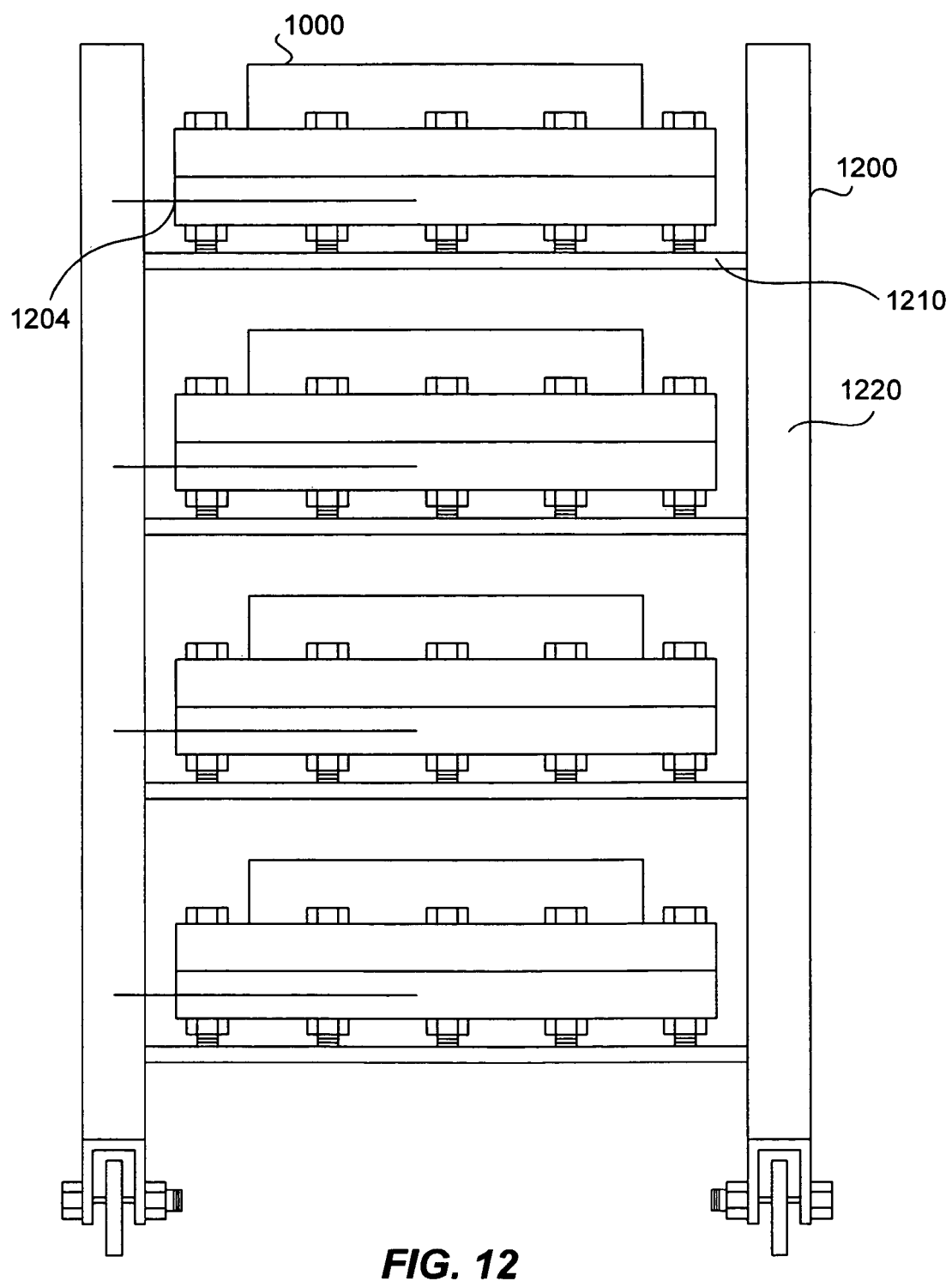
FIG. 12 is an elevation view of a platen rack having loaded therein a plurality of alternative platen assemblies.

Another embodiment of the present invention is disclosed having reference to FIGS. 11A-F, 12, and 13. This embodiment utilizes a platen assembly 1000 similar to at least one of the previously described platen assemblies. Platen assembly 1000 is, however, designed to accommodate a plurality of substrate-dye sheet pairs arranged as a substrate stack 1003. At FIG. 11A, a substrate 1 and dye carrier 3, having image 5 imprinted thereon utilizing dye sublimation inks as previously disclosed, are loaded as before. Thereafter, alternating layers of substrate 1 and dye carrier 3 are loaded until a substrate stack 1003 having the desired thickness is formed, as shown at FIG. 11B.

In this embodiment, platen assembly 1000 comprises a platen 1001 substantially as previously discussed, but further incorporating some clamping device for holding frame 1010 to platen 1001, as shown at FIG. 11C. Frame 1010 is substantially like the previously disclosed frames, but has provisions for being clamped to platen 1001. In the embodiment presented in FIGS. 11A-F, 12 and 13, this clamping is effected by means of a plurality of bolts 1020 inserted through holes formed about the periphery of frame 1010 and thereafter inserted through a corresponding plurality of matching holes formed about the periphery of platen 1001. Thereafter, a nut 1022 is threaded onto each of bolts 1020 to secure frame 1010 to platen 1001 and capturing, under membrane 16, substrate stack 1003. While the clamping together of frame 1010 and platen 1001 in this example has been effected by the simple expedient of utilizing a plurality of threaded nuts and bolts, study of the principles enumerated herein will elucidate to those having ordinary skill in the art that a wide variety of known clamping methodologies may, with equal facility, be implemented. These clamping methodologies include, but are specifically not limited to, patent clamps, over-center clamps, wedges, C-clamps and other threaded clamps, ratchet clamps, catches, magnetic catches, electromagnetic clamping devices, and the like. The principles of the present invention specifically contemplate all such known clamping alternatives.

After frame 1010 is clamped to platen 1001, as shown at FIG. 11D, a vacuum is applied at vacuum orifices 14, which vacuum forms the atmospheric clamping pressure previously disclosed at 20. Once atmospheric clamping 20 is applied, thermal energy is applied at 22 to raise the temperature of substrate stack 1003 to the desired sublimation temperature. This atmospheric clamping pressure is maintained on substrate stack 1003 for the balance of the imaging process until it is desirable to remove the several elements of substrate stack 1003 following processing. After the desired interval required for dye sublimation imaging, thermal energy is removed at 24 to enable the several sheets of substrate 1 to return to their substantially rigid state. Thereafter, nuts 1022 are removed from bolts 1020, bolts 1020 withdrawn from platen 1001 and frame 1010, and frame 1010 removed from platen 1001. This enables the removal from platen 1001 of the substrate stack 1003 and the separation of that stack into its component individual substrates 1 and dye carriers 3. At this point, as before, the image formed by reverse image 5 has been transferred into the several ones of the plurality of substrate 1 in substrate stack 1003.

This embodiment of the present invention enables significantly longer imaging times. These lengthened imaging times present both advantages and challenges. One advantage is that a substrate may be imaged throughout the entire thickness of the substrate, resulting in a particularly rich, translucent image. The challenge in this case is to confine the image to one substrate. Long imaging times enable the unwanted migration of dyes from one substrate to another. This can lead not only to loss of resolution, but loss of registration accuracy, and uneven imaging throughout the several substrates of the substrate stack.

In order to preclude the unwanted migration between substrates, a dye stop may be inserted between individual substrate-dye carrier pairs. By placing such a dye stop, for instance a layer of metal foil, between a first substrate 1 and the dye carrier 3 of the substrate adjacent thereto, this unwanted dye migration may be obviated. The dye stop layer may, with equal facility, be implemented by forming the dye stop as a layer on the side of dye carrier 3 opposite to the image formed thereon, for instance by laminating a layer of metal foil.

While platen assembly 1000 disclosed in FIGS. 11A-F may be utilized in conjunction with any of the previously disclosed apparatuses, the utilization of this platen assembly enables large-scale batch processing of substrate material. One means for implementing such large-scale production utilizes at least one, and preferably a plurality of transportable platen racks 1200.

Platen rack 1200 in this embodiment takes the form of a movable shelf unit having at least one and preferably a plurality of shelves 1210 for receiving therein at least one and preferably a plurality of platen assemblies 1000. As it is desirable to maintain atmospheric clamping pressure by means of the vacuum applied to vacuum orifices 14 throughout the thermal events of the dye sublimation process taught herein, the several vacuum orifices 14 are connected by means of a vacuum hose 1204 to a vacuum reservoir 1220 for transportation from an area where platen assemblies 1000 may be loaded to an area where they may be imaged. Such an area is shown having reference to FIG. 13.

Figure 13:
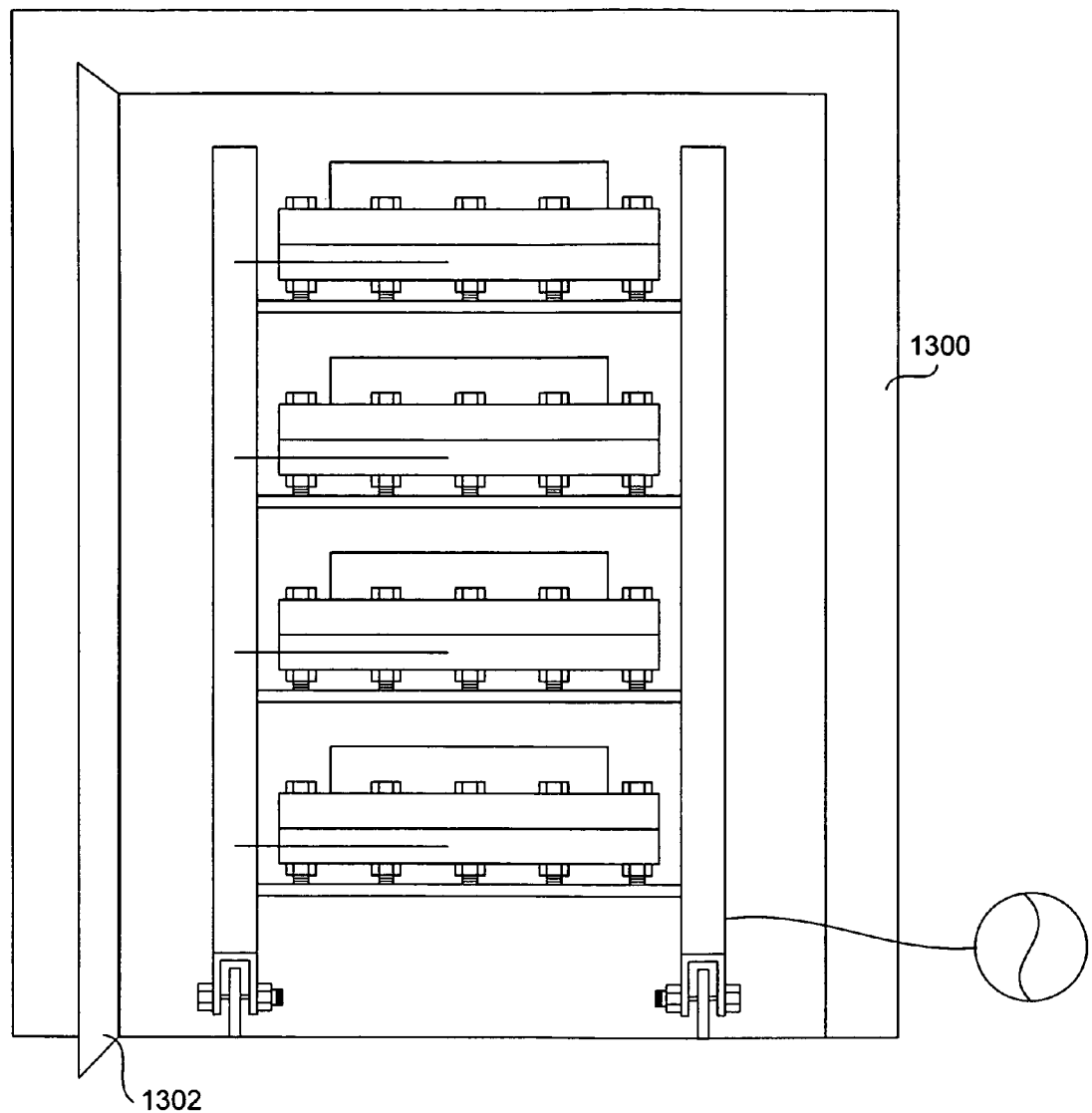
FIG. 13 is an elevation view of a platen rack having loaded therein a plurality of alternative platen assemblies, the platen rack being received into an oven.

At FIG. 13 is shown an oven 1300 capable of receiving therein at least one, and preferably a plurality of platen racks 1200. Once the desired number of platen assemblies 1000 and platen racks 1200 has been received into an interior portion of oven 1300, oven door 1302 is secured, and the temperature within oven 1300 elevated to a temperature sufficient to achieve the thermal imaging temperature required by the several substrate elements of substrate stack 1003. This temperature may again be monitored by means of a thermocouple, inserted beneath membrane 16.

Once the desired imaging temperature has been reached and maintained for the desired imaging time, the several platen assemblies 1000 may be cooled to effect the second thermal event of the dye sublimation imaging process taught by the present invention. This cooling may be effected by the simple expedient of withdrawing platen racks 1200 from oven 1300 and allowing platen racks 1200 and platen assemblies 1000 to cool by natural air circulation. Alternatively, platen racks 1200, retaining platen assemblies 1000 therein, may be subjected to an active cooling process. Such active cooling may be effected by means of inserting platen racks 1200 into a refrigerator, or immersing them in a bath of chilled fluid. Alternatively, where oven 1300 is also equipped with a refrigeration capability, such refrigeration may be activated and oven 1300 may be utilized to implement an active cooling step.

In one application of this embodiment of the present invention, an 80 mil Acrylonitrile-Butadiene-Styrene-Copolymer (ABS) sheet was utilized as substrate 1. A plurality of ABS sheets were imaged by superimposing a dye carrier 3 and a dye stop layer 1003 atop each sheet. The plurality of ABS sheets were then positioned atop passive cooling device 12. Frame 1010 was then lowered, covering the several substrate-dye carrier-dye stop stacks with membrane 16. In this embodiment, a silicone rubber sheet was implemented as membrane 16. After evacuation of the space under membrane 16, processing proceeds as previously discussed for this embodiment. In this case, the ABS sheets were processed for three hours at a temperature of 300° F. After this first thermal event, cooling proceeded as previously discussed.

It should be noted that the use of passive cooling device 12 is optional in this embodiment.

Yet another embodiment of the present invention is disclosed having reference to FIGS. 14A-E. This embodiment of the present invention implements a vacuum bagging approach to applying the previously discussed vacuum clamping. At FIG. 14A there is shown a vacuum bag or envelope 600. Vacuum bag 600 may be advantageously formed from any number of heat-resistant, flexible materials which are substantially impervious to air transmission. By way of illustration, but not limitation, examples of such materials include silicone rubber sheeting, butyl rubber sheeting, heat-resistant plastics and other polymers, and impregnated fabrics. One material particularly suited for forming vacuum bag 600 of the present invention is a 2 mil advanced nylon sheeting available from GEM Polymer Corporation, P.O. Box 210 Lakeside Avenue, Delano, Pa. 18220-0210. This material is heat-resistant to temperatures in excess of 400 degrees Fahrenheit and is available either as custom-made bags, or as rolls of sheet film for user fabrication.

In order to evacuate the interior of vacuum bag 600, a vacuum probe 602 is fitted therethrough. Vacuum probe 602 serves to form a vacuum-tight penetration through vacuum bag 600 and to attach a vacuum source, not shown, for evacuating the interior of vacuum bag 600. Any of several known vacuum probes may be utilized for this function: one such vacuum probe is a model VP36 available from Torr Technologies, Inc., 1435 22nd St. N.W., Auburn, Wash. 98001. Alternative vacuum probes may, of course, be fitted.

An imaging stack 640 is made up as follows: a substrate 1 has superimposed thereon a dye carrier 3, as previously discussed. Atop dye carrier 3 is placed a dye stop 652 consisting of a sheet of aluminum foil. Alternatively, the side of dye carrier 3 opposite the image side thereof may have laminated thereon, or printed thereto, a layer of dye stop material, for instance a layer of metalized foil. A plurality of imaging stacks 640 are further stacked to form imaging body 650.

Imaging body 650 may optionally include one or more accessory layers 654. Examples of these accessory layers include, but are not necessarily limited to, stiffening plates and pressure leveling layers. By way of illustration, but not limitation, stiffening plates may be formed of plywood, metal sheets, and composite materials, including honeycomb panels. Pressure levelers may be implemented utilizing pads of heat-resistant resilient foam, or other resilient materials. Again, in illustration but not limitation, one example of such heat-resistant foam is a layer of expanded silicone rubber foam.

Figure 14A:
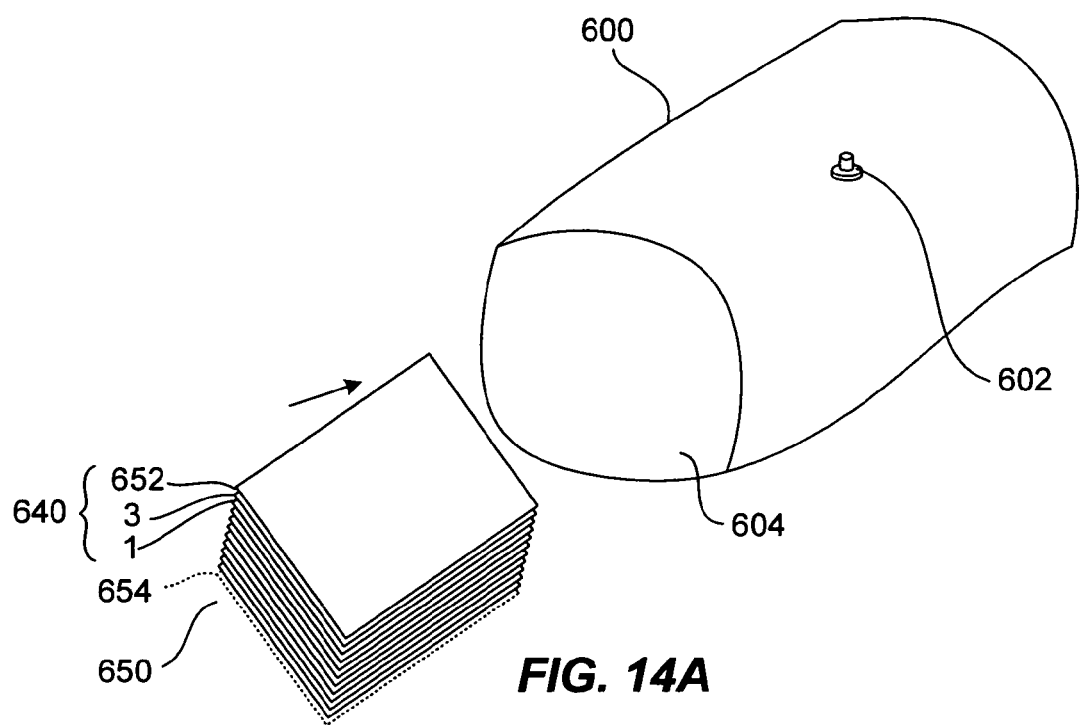
Figure 14B:
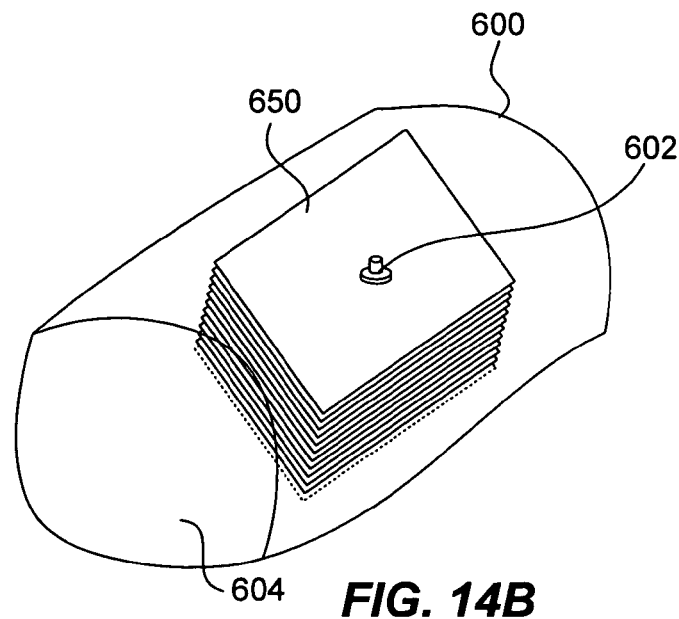

Once imaging body 650 has been formed, it is inserted into opening 604 of vacuum bag 600 as shown at FIG. 14B. Thereafter, as shown at FIG. 14C, opening 604 is sealed at 606. Seal 606 may be effected by substantially any vacuum sealing methodology known to those having ordinary skill in the art. Again by way of illustration but not limitation, such seals include the thermal bonding of adjacent portions of opening 604, the use of sealing extrusions, cements, tapes, glues, clamps, and the closure of opening 604 followed by rolling at least a portion of opening 604 upon itself and thereafter securing that portion with clamps. Additionally, some of the previously discussed closure methods may implement the use of sealing compounds, putties or dopes to perfect the previously discussed vacuum seal.

Once seal 606 of vacuum bag 600 has been formed, vacuum bag 600 is evacuated at 620 through vacuum probe 602, forming evacuated imaging package 670. A vacuum source, not shown, is utilized to effect this evacuation. The evacuation of imaging package 670 may utilize vacuum piping, not shown, which is left in place during the imaging process, or may utilize a disconnect valve incorporating a vacuum check valve. This latter option enables imaging package 670 to be formed and removed from the vacuum source during imaging.

Following the formation of imaging package 670, it is heated to perform the previously discussed first thermal event. In one embodiment of the present invention, this heating is performed by means of inserting imaging package 670 into an oven 700, thereafter closing oven doors 702, and heating the interior of oven 700 to a desired imaging temperature. Imaging package 670 is retained within oven 700 for a desired imaging period, and thereafter cooled, to perform the second thermal event. The cooling of imaging package 670 may be effected as previously discussed by means of withdrawing imaging package 670 from oven 700 and allowing the natural circulation of air to cool imaging package 670. Alternatively, imaging package 670 may be cooled by means of introducing a flow of cooled gas, fluid, or air about imaging package 670, or by immersing imaging package 670 into a body of cooled fluid.

Once imaging is completed, vacuum is released from within imaging package 670, seal 606 is opened, imaging body 650 removed therefrom, and the several elements thereof separated resulting in a plurality of imaged substrates 1.

In one application of this embodiment of the present invention, a plurality of 40 mil polycarbonate sheets, 30 inches by 60 inches, were imaged by forming imaging body 650 as discussed. Imaging package 670 was formed by evacuating vacuum bag 600 to a substantially complete vacuum. Thereafter, imaging package 670 was inserted into oven 700 and heated at 265° F. for a period of three hours. Following imaging, imaging package 670 was removed from oven 700 and allowed to cool, utilizing natural air circulation. Once cooling was effected, vacuum was released and imaging body 650 separated into its component substrates, as discussed.

Figure 15:
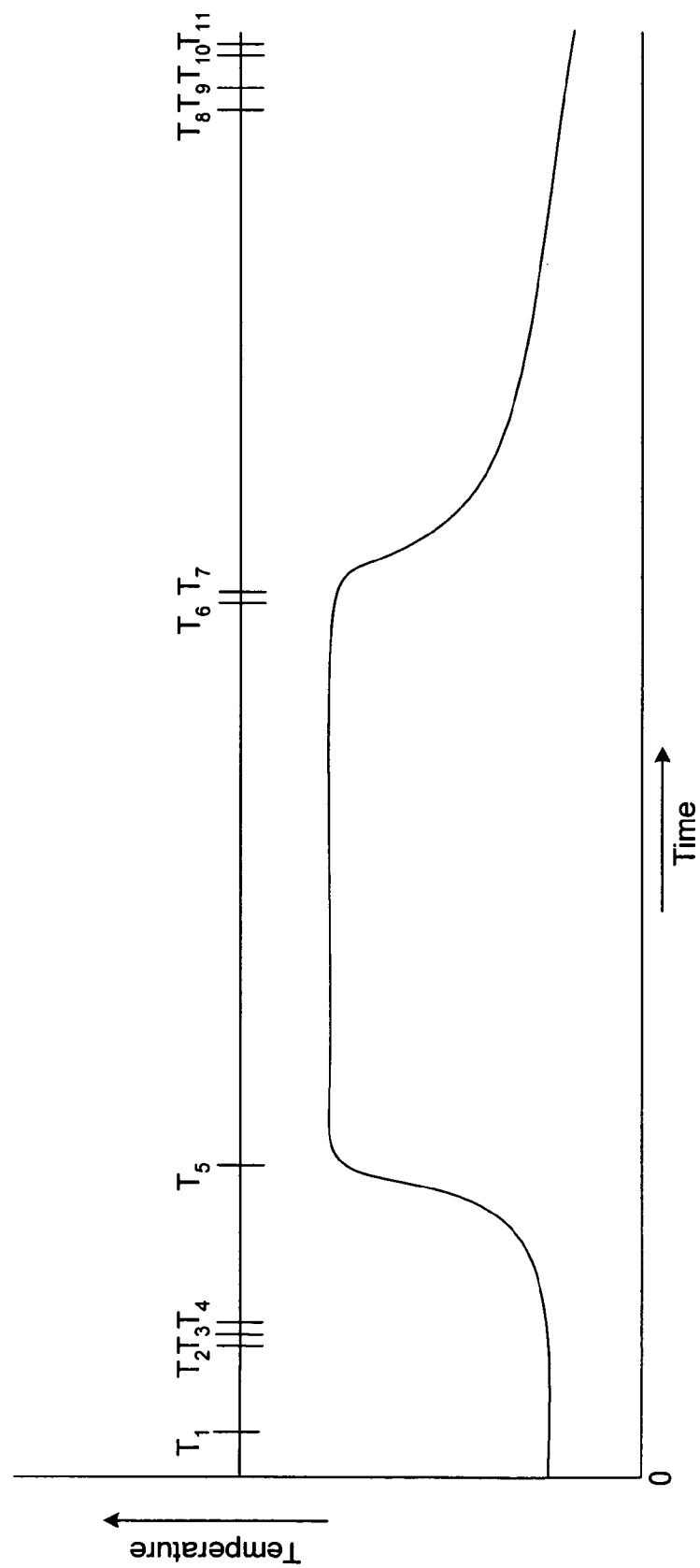
FIG. 15 is a graph of temperature over time for one dye sublimation imaging cycle, having superimposed thereon a time line indicating the several control actions required to effect the cycle.

Reference was previously made to both those thermal events of a dye sublimation imaging cycle taught by the present invention, and to a control station for controlling the several events of such a dye sublimation imaging cycle. Each of these concepts is further explored having reference to FIG. 15. FIG. 15 is a graph of temperature over time of one dye sublimation imaging cycle utilizing active cooling.

FIG. 15 further includes a time line indicating the several control actions required to effect the dye sublimation imaging cycle. At time $T_1$, at least one platen is loaded with at least one substrate-dye carrier pair, as previously discussed. At this point in time, the temperature of the substrate-dye carrier pair is the ambient temperature. At time $T_2$, vacuum is applied to the several vacuum orifices 14 of platen assembly 204, effecting the previously discussed atmospheric clamping force. Thereafter, at $T_3$, platen assembly 204 is loaded into the thermal imaging unit of the apparatus. At time $T_4$, heat is applied through membrane 16 to dye carrier 3 and substrate 1. At time $T_5$, the required dye sublimation temperature has been attained. The time interval between $T_4$ and $T_5$ represents the time required to elevate the temperature of substrate 1 and dye carrier 3 to the required dye sublimation temperature. Accordingly, it will be appreciated that $T_4$-$T_6$ comprises the first thermal event taught by the present invention. At time $T_6$, the required dye sublimation time interval has been achieved, and the time between $T_5$ and $T_6$ represents this interval. At time $T_6$, heat is secured, and immediately thereafter at $T_7$ cooling is applied to substrate 1 and dye carrier 3. At time $T_8$, substrate three has been cooled to its substantially rigid temperature and cooling is secured. Accordingly, it will be appreciated that $T_7$-$T_8$ represent the second thermal event of the present invention. Thereafter, at $T_9$, platen assembly 204 is removed from the thermal imaging unit. At time $T_{10}$, the vacuum is released beneath membrane 16, releasing the atmospheric clamping pressure of that membrane to substrate 1 and dye carrier 3. At $T_{11}$, the platen 10 may be unloaded and subsequently reloaded for another dye sublimation imaging cycle.

One or more of the control actions indicated may be performed manually, remotely, or automatically. An example of a manual control action is where a human operator manually operates a control element, for instance one of the previously disclosed vacuum, heating, or cooling valves. A remote control action is where a human operator utilizes a remote control, for instance a switch actuating a remotely controlled electrical valve, to initiate the control action. An automatic control action is where a sequencing device initiates a control action in response to a predetermined time interval or to a state indication. An example of such a state indication is where the temperature sensed by thermocouple 212 which could not only effect the ramp-up of temperature shown between $T_4$ and $T_5$, and the ramp-down of temperature shown between $T_7$ and $T_8$, but also could serve to alternately open and close a heating control valve to maintain the temperature specified between $T_5$ and $T_6$.

From the preceding discussion of imaging times, clamping pressures, imaging temperatures, and cooling times, it will be appreciated that the principles enumerated herein are applicable over a wide range of these variables. While the specifics of any given imaging regime are both highly specific and empirically determinable, in general terms, the present invention contemplates imaging temperatures for most plastic substrates at temperatures between 200° F.-600° F.; more particularly between 225° F. and 400° F., and more particularly still at temperatures between 250° F. and 370° F.

Similarly, imaging times of between 15 seconds and 12 hours have been shown to be advantageous for some embodiments of the present invention. More specifically, imaging times of between one minute and one hour may be implemented with advantage. Still more particularly, imaging times between 90 seconds and 15 minutes have been found satisfactory for some imaging regimes.

In like fashion, imaging pressures equating from 0.25 atmospheres to 20 atmospheres may be utilized to advantage. More particularly, such pressures from 0.5 to 5 atmospheres, and still more particularly, imaging pressures of 0.7 to 1.5 imaging pressures are satisfactory for a wide variety of plastic substrates.

Figure 16A:
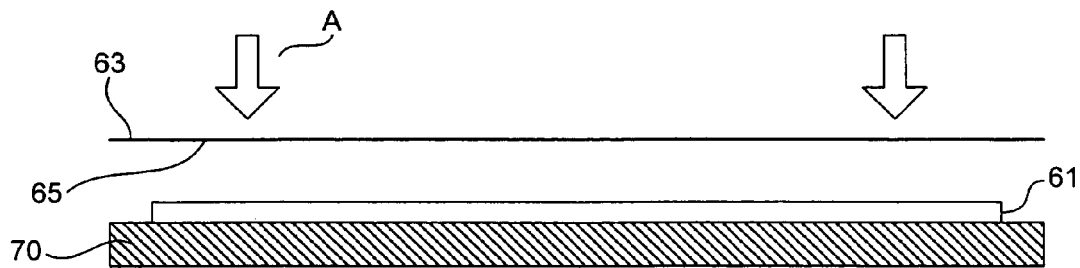
FIGS. 16A-H are cross-sectional views through upper and lower platen assemblies according to another embodiment of the present invention, demonstrating the continuous dye transfer methodology taught herein.
Figure 16B:
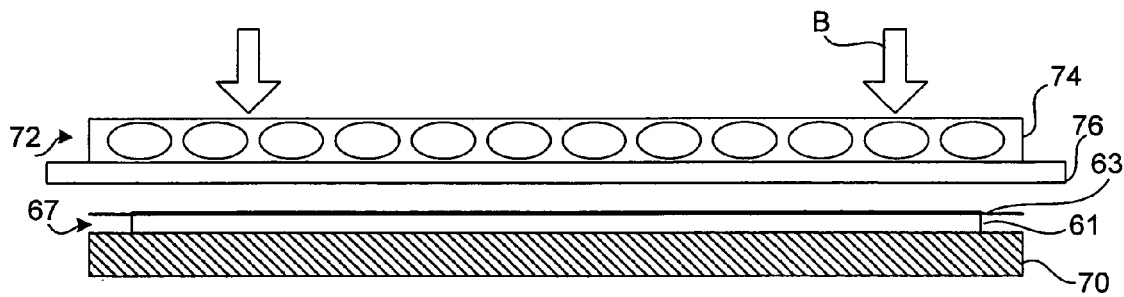

Having reference now to FIGS. 16A-16H, a methodology taught by the present invention for continuously forming dye sublimation images in substrates, generally in solid plastic substrates, is shown. At FIG. 16A is shown a lower platen, having superimposed thereon a substrate 61. At "A", a dye carrier 63 having a dye sublimation image 65 imprinted thereon is disposed with image 65 in contact with substrate 61. At FIG. 16B, an upper platen assembly 72 is shown superimposed above image pair 67, which consists of substrate 61 and dye carrier 63. As shown in this illustration, upper platen assembly 72 here includes heating element 74 and upper platen 76.

Figure 16C:
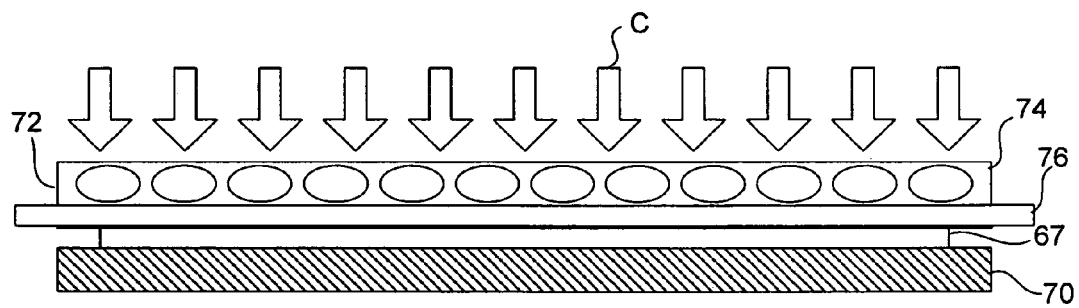

At FIG. 16C, upper platen assembly 72 has applied thereto, at "C", a continuous clamping pressure. This clamping pressure is applied, in operative combination with lower platen 70, continuously across image pair 67. In the specification and claims, a continuous clamping pressure is defined as a pressure that is spatially continuous against all parts of the substrate to which an image is to be transferred. Such a continuous clamping pressure would not have any spatial gaps on the parts of the substrate to where the image is to be transferred. Such continuous clamping pressure may be between 5-50 pounds per square inch. More specifically, such continuous clamping pressure may be between 9-20 pounds per square inch. Such continuous clamping pressure may also be even, so that each point of pressure may have the same pressure. Subsequent to the application of planting pressure "C", at FIG. 16D heat is applied, at "D", to heating element 74 and the upper platen 76, thereby applying heat to image pair 67. This heat comprises the first thermal event used in forming dye sublimation image in substrate 1.

The heating, or first thermal event, is applied to image pair 67 at a specified temperature for a specified period of time. The specified heat, and the duration of its application, are highly application specific. Generally, the heating may be to a temperature above the glass transition temperature of the substrate. The glass transition temperature $T_G$ is the temperature above which the substrate loses its rigidity.

Figure 16D:
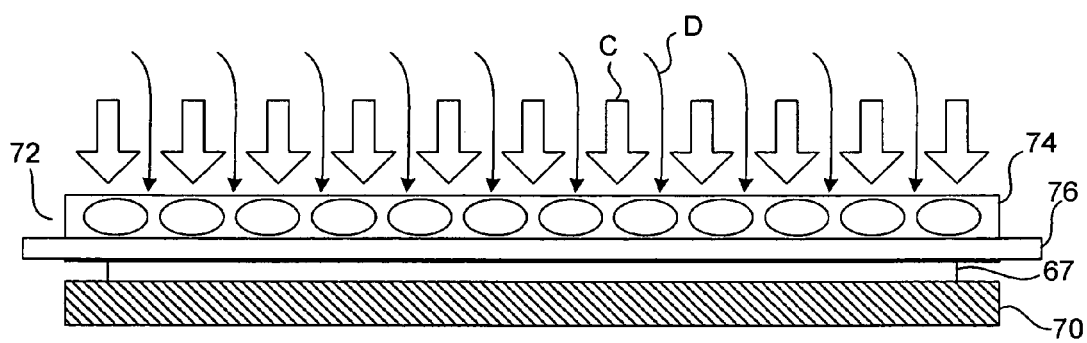
Figure 16E:
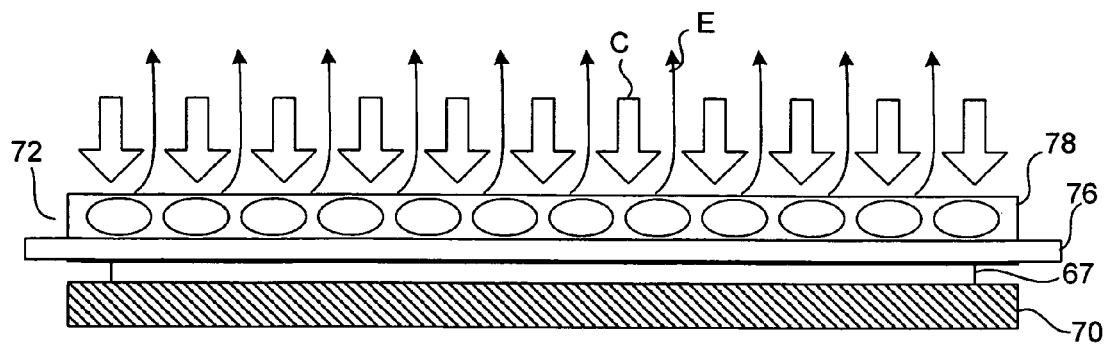

Subsequent to the application of the first thermal event, or heat "D" shown at FIG. 16D, a second thermal event is performed, as shown at FIG. 16E. In this thermal event, heat is removed from upper platen assembly 72 as shown at "E" by means of cooling element 78. At this stage of the process, heating element 74 has been replaced by cooling element 78.

Clamping pressure "C" is maintained during both the first and second thermal events as shown at FIGS. 16D and 16E and between such steps. Moreover, it should be noted that the second thermal event, or cooling step "E", may also be performed at a specified temperature for a specified period of time, which may be dependent on the type of material being processed. During this step, the substrate may be cooled to a temperature below the glass transition temperature. The glass transition temperature is the temperature below which the substrate is rigid.

Figure 16F:
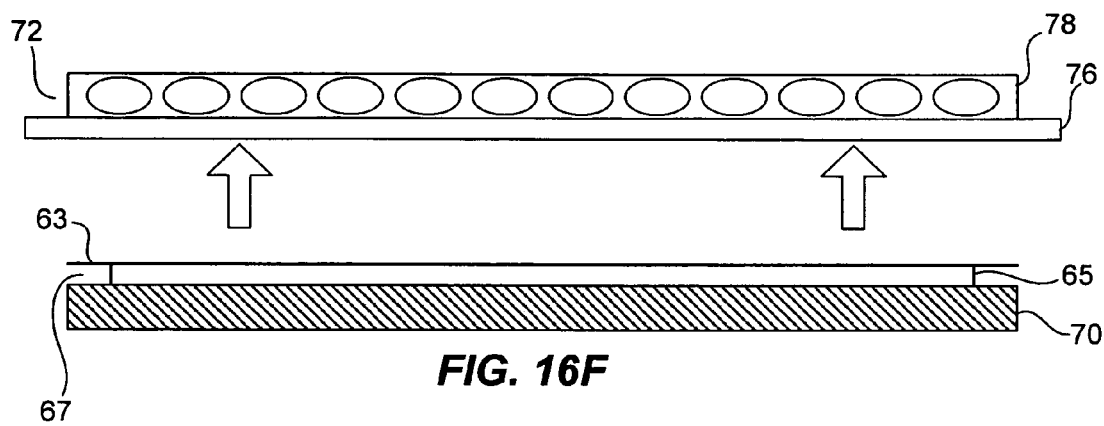
Figure 16G:
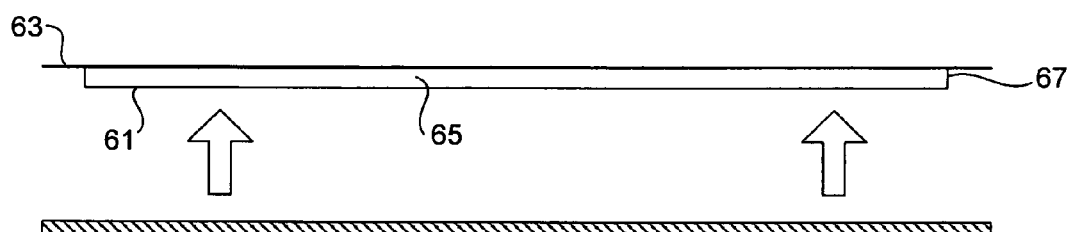
Figure 16H:

Following this second thermal event, clamping pressure "C" is removed from upper platen assembly 72, which is subsequently retracted upwardly, for instance as shown in FIG. 16F. Thereafter, image pair 67 is removed from lower platen 70, as shown in FIG. 16G. Image pair 67 may then be separated into its constituent components: dye carrier 63 and substrate 61. Substrate 61 now contains image 65, as shown at FIG. 16H. It should be noted that the steps illustrated at FIGS. 16G and 16H may be performed in the opposite order, once upper platen assembly 72 has been retracted, as at FIG. 16F.

Figure 17:
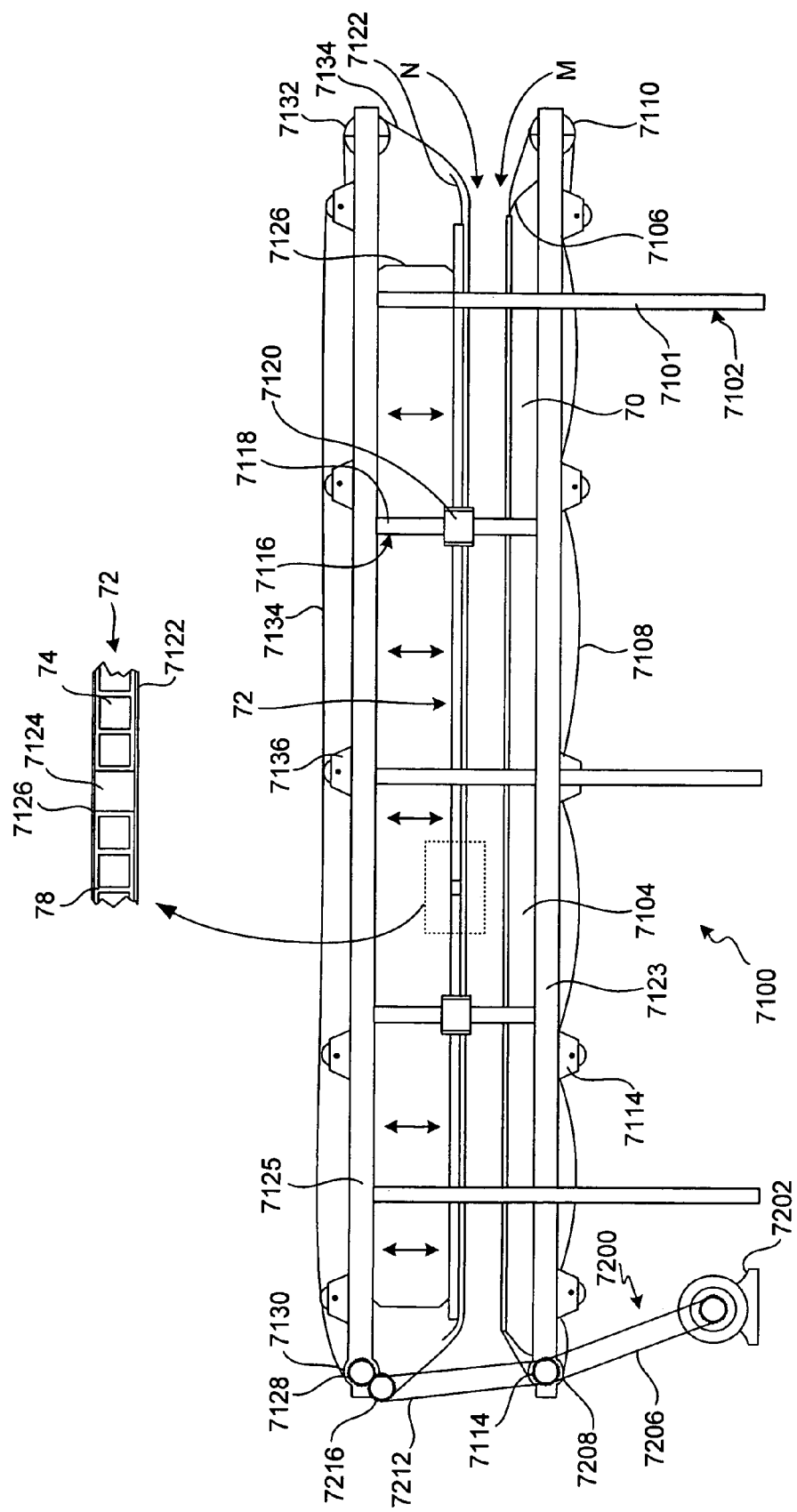
FIG. 17 is a side view of one apparatus for performing the continuous dye transfer methodology of the present invention, prior to applying a clamping pressure between the upper and lower platen assemblies.

Referring now to FIG. 17, one apparatus 7100, for performing the methodology of the present invention, is shown. This apparatus, sometimes referred hereinafter as "a continuous dye transfer imaging apparatus", is implemented on a frame assembly 7102 supported by legs 7101. Frame assembly 7102 may advantageously be formed as a weldment of individual steel components, for instance square steel channel formed of hot-rolled, cold-rolled, or extruded steel. Alternative materials may, of course, be implemented. Mounted on frame assembly 7102 is lower platen assembly 70.

Lower platen assembly 70, in this embodiment, includes lower platen 7104 which supports lower slide 7106. One embodiment of the present invention contemplates implementing a hex-cell aluminum-cored composite sandwich panel having glass-reinforced plastic upper and lower surfaces for lower platen 7104. One such panel is a Fiber-Lok No. 2330 sandwich panel available from Burnham Composites, Wichita, Kans. The use of such panels provides a lower platen which has exceptionally low thermal mass, which can contribute to the efficiency of the apparatus.

Lower slide 7106 is preferably formed of a material which exhibits a low coefficient of friction with respect to lower belt 7108, as will be later explained. Lower belt 7108 forms a continuous loop about lower platen assembly 70, lower-idler roller 7110, and lower drive roller 7112. Lower belt 7108 is contained within frame 7102 and may optionally be supported, on its return path, by one or more lower return roller assemblies 7114. Lower belt 7108 may be advantageously urged in the direction indicated at "M" by means of a drive assembly 7200, later explained.

One or more of return roller assemblies 7114 and 7136 may be powered or unpowered. This is primarily a matter of scale: larger implementations of the apparatus herein disclosed may advantageously employ one or more powered return roller assemblies to facilitate motion of their respective belts. In the exemplar herein presented, return roller assemblies 7114 and 7136 are unpowered, and consist of pillow blocks housing bearings which support idler shafts on which are mounted the return rollers. Where it is desired that one or more return roller assemblies 7114 and 7136 be powered, power may be taken from the appropriate one of lower drive sprocket 7208 and upper drive sprocket 7214 by means of a return roller chain, not shown. Alternative roller drive mechanisms, well known to those having ordinary skill in the art, may with facility be implemented.

Upper platen assembly 72 is movably superimposed over lower platen assembly 70 within frame assembly 7102. The movement of upper platen assembly 72 with respect to lower platen assembly 70 is substantially restricted to movement orthogonal to the plane of lower platen assembly 70 by means of one or more platen alignment assemblies 7116.

In one embodiment of the present invention, platen alignment assembly 7116 comprises alignment column 7118 and alignment bearing 7120. According to this embodiment, alignment column 7118, which may be formed, for instance, of cold-rolled steel, is affixed between lower horizontal rail 7123 and upper horizontal rail 7125 of frame assembly 7102. This attachment may be by means of welding, mechanical fasteners, or other attachment means well-known to those having ordinary skill in the art.

Alignment column 7118 is slidably received within alignment bearing 7120. Alignment bearing 7120 may be formed as a simple bushing, for instance an oiled bronze bushing, or may take the form of a ball bearing assembly. Alternative bearing methodologies for reducing sliding friction under load may, with equal facility, be implemented. Alignment bearing 7120 is affixed to upper platen assembly 72, thereby enabling upper platen assembly 72 to be moved substantially perpendicular to lower platen assembly 70 while substantially maintaining the alignment between upper platen assembly 72 and lower platen assembly 70. Upper platen assembly 72 comprises upper slide 7122, heating element 74, cooling element 78, and preferably an insulator 7124 interposed between heating element 74 and cooling element 78. Alternative alignment methodologies well known to those having ordinary skill in the art may, with equal facility, be implemented. These include, but are specifically not limited to, the use of: hydraulic actuators, pneumatic actuators, scissor braces, sliding butt blocks, levers, bell cranks, cables, electromagnetic actuators, gear drives, and the like.

Examples of applicable heat transfer methodologies include, but are specifically not limited to: electrical resistance heating, for instance by means of electrical resistance wires embedded in upper and lower belts 7134 and 7108, or applied either above or below upper and lower belts 7134 and 7108; by the application of steam to a surface of upper and lower belts 7134 and 7108; by the application to a surface of upper and lower belts 7134 and 7108 of a flow of heated gas including steam, flame or heated fluid; or by the application of radiant energy to upper and lower belts 7134 and 7108. Examples of such radiant energy include, but are not limited to, infrared energy applied by means of infrared lamps, or ultraviolet radiation, and microwave radiation.

Another alternative for applying thermal energy is the application to a surface of upper and lower belts 7134 and 7108 of a conductive heating source, for instance a heated plate. Again, this plate may be heated by any known heating methodologies, such as those previously discussed, as well as by introducing into a hollow interior of the plate a flow of heated fluid or gas. One preferred embodiment utilizes conductive heating and cooling as shown in FIG. 17.

This embodiment utilizes a conductive heating plate as heating element 74. In this embodiment, heating element 74 may be heated by any means known to those having ordinary skill in the art including, but not limited to: electrical resistance wiring; the introduction of heated gases or fluids into a hollow interior portion of heating element 74; radiant or convective heating of the conductive heating plate; open flame including one or more gas jets, as well as substantially any other methodology of controllably heating a conductive metal plate. In the embodiment depicted in the referenced figures, heating element 74 takes the form of a flat aluminum plate rendered partially hollow by the formation therein of at least one labyrinthine passage. In the embodiment depicted in this figure, heating element 74 is connected by means of piping and valves to an oil heater, including an oil circulation pump, not shown. The oil heater thus provides a controllable flow of heated oil through the interior labyrinth of heating element 74 when it is desired to heat the plate. The flow of heated oil may be thermostatically controlled by hot oil valves and hot oil piping, not shown, to retain heating element 74 at a desired temperature, or within a desired temperature range.

Upper platen assembly 72 is urged toward lower platen assembly 70 by means of press 7126. In one embodiment of the present invention, press 7126 takes the form of a bag press. It has been found that the use of such a pneumatic bag press provides an extremely even and continuous clamping pressure across the entire surface of upper platen assembly 72, thereby rendering the formation of dye transfer images more even. The bag press and the atmospheric clamping system described above use a gas pressure differential to provide clamping. Such gas pressure differential systems provide an even pressure, while allowing an easy heating and cooling of the substrate and image carrier, since gasses may have a lower heat capacity. Alternative press methodologies may of course be implemented. By way of illustration, but not limitation, these alternative press methodologies include hydraulic presses, mechanical presses, electromagnetic actuation, and substantially any other means of linear actuation or urging well-known to those having ordinary skill in the art.

While press 7126 is implemented to impart downward motion and pressure to upper platen assembly 72, it is also desirable that platen assembly 72 be raised above lower platen assembly 70 when the apparatus is not in use. Accordingly, a lifting device may be optionally implemented, for instance between upper platen assembly 72 and upper horizontal rail 7125, for imparting a lifting motion to upper platen assembly 72. These lifting devices include, but are specifically not limited to, springs, pneumatic cylinders, hydraulic cylinders, servo motors, counterweights, screw or geared devices, magnets including electromagnets and all other elevating and depression methodologies known to those having ordinary skill in the art.

Disposed beneath a lower surface of upper slide 7122, and about upper drive roller 7130 and upper idler roller 7132, is a continuous upper belt 7134. Upper belt 7134 is contained within frame 7102 and may optionally be supported, on its return path, by one or more upper return roller assemblies 7136. Upper belt 7134 may be advantageously urged in the direction indicated at "N" by means of drive assembly 7200, later explained.

Upper and lower belts 7134 and 7108 should have sufficient strength to prevent the warping of substrate 61 during the thermal events which constitute one dye sublimation cycle and which enable dye sublimation imaging and dye carrier removal, as will be later explained.

Other properties desirable of upper and lower belts 7134 and 7108 are that they are substantially chemically compatible not only with substrate 61 and the sublimatic dyes imprinted on dye carrier 63, but also with any byproducts out-gassed from substrate 61 or dye carrier 63 during dye sublimation imaging.

In one embodiment of the present invention, the surface of at least one of upper and lower belts 7134 and 7108 which contacts dye carrier 63 is lightly textured to provide a continuous vacuum channel across the interface between upper and lower belts 7134 and 7108 and dye carrier 63 without forming bubbles between the belts and dye carrier. These bubbles may preclude even and continuous clamping of dye carrier 63 to substrate 61.

In order to flow smoothly around the several rollers, idlers and slides of the present invention, it is desirable that upper and lower belts 7134 and 7108 be formed of a flexible material. As the imaging process taught herein utilizes rapid temperature changes, as well as sustained periods of temperatures up to 600° F., it is also required of the belts that they be not only heat-resistant, but that it be capable of withstanding repeated thermal cycles between higher and lower temperatures without hardening, cracking, loss of structural integrity or loss of any of the previously discussed properties.

From the foregoing discussion, it will be appreciated that a number of materials are suitable for upper and lower belts 7134 and 7108. Examples of such materials include, but are specifically not limited to: vulcanized rubbers, silicones, butyl rubbers, polymers, chloropolymers, fluoropolymers, and other natural or man-made elastomeric sheets.

Where the principles of the present invention are applied to a small-scale apparatus, for instance a device for forming identification badges, the friction between upper and lower belts 7134 and 7108, upper and lower slides 7122 and 7106, and upper and lower drive rollers 7130 and 7112 is de minimus. Where these same principles are applied to a larger scale apparatus, for instance one for forming images on plastic sheets having extents as wide as four feet by eight feet or even greater, the friction between these several elements needs to be accounted for.

In such large scale devices, the coefficient of friction between belts and slides must be rendered as low as possible. Conversely, the friction between the belts and the imaging pair should be sufficiently high enough to provide the requisite nipping at the in-feed side of the apparatus to draw the imaging pair into the apparatus.

To accomplish these ends, one or both of upper and lower belts 7134 and 7108 may be formed of two layers: one, which contacts the respective one of slides 7122 and 7106 having a relatively low coefficient of friction and the other, which contacts imaging pair 67 having a relatively high coefficient of friction, so that the relatively low coefficient of friction is less than the relatively high coefficient of friction. This desired result may be had by forming the belts of two layers, each having a different coefficient of friction. According to one embodiment of the present invention, belts 7134 and 7108 are formed of canvas belting having laminated thereto a layer of DuPont Tyvek™, where the canvas belting contacts and nips in the imaging pair, and the Tyvek™ reduces friction across the appropriate slide. To further reduce friction between the appropriate slide/belt pair, the contact surface of the slide may be formed or coated to further reduce friction. In one embodiment, this may be done by implementing polished stainless steel sheet to form at least one of slides 7122 and 7106. In another embodiment, DuPont Teflon™ is coated on at least one of the belt and the slide to further reduce friction. Alternative friction-reducing methodologies, well known to those of skill in the art, may also be implemented.

In contrast, the friction between drive rollers 7130 and 7112 should be high to provide for accurate, positive driving of the belt through the apparatus. This may be accomplished by roughing the surface of at least one of drive rollers 7130 and 7112. Alternatively, this may be accomplished by forming cogs on the surface of drive rollers 7130 and 7112, which cogs mesh with serial perforations forming on the edges of belts 7134 and 7108, much like well-known 35 mm photographic film. Alternative friction-increasing methodologies, well known to those of skill in the art, may also be implemented.

Figure 18:
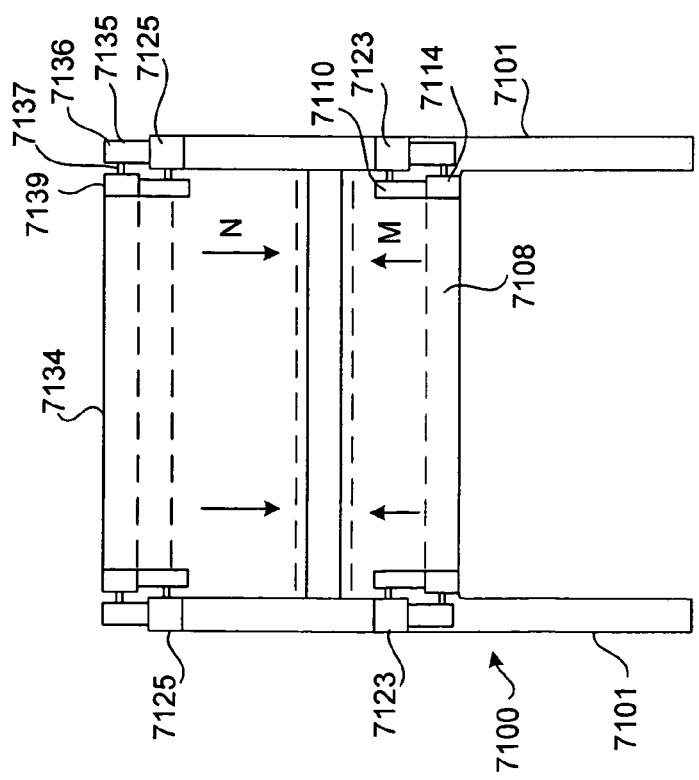
FIG. 18 is a front view of one apparatus for performing the continuous dye transfer methodology of the present invention, prior to applying a clamping pressure between the upper and lower platen assemblies.

Referring now to FIG. 18, a front view of apparatus 7100 of the present invention is shown. This aspect of the apparatus of the present invention illustrates the in-feed of the apparatus, as well as certain details of return roller assemblies 7114 and 7136. Study of FIG. 18 shows that belts 7108 and 7134 move substantially inwardly as shown at "N" and "M". What is not readily apparent is that the speeds of advance in these two directions are precisely matched, so that the belts move synchronously. Accordingly, the action of belts 7108 and 7134, once pressure has been applied to upper platen assembly 72 by means of press 7126, serves to nip the aligned imaging pair 67, to draw the imaging pair into apparatus 7100, to maintain a continuous pressure on the imaging pair during the first and second thermal events of the imaging cycle and, finally, to retain the registration of dye transfer sheet 63 with respect to substrate 61 during the first and second thermal events of the imaging cycle.

Also shown in this figure are details relating to the formation of return roller assemblies 7114 and 7136. Return roller assembly 7136, in this nonpowered example, is shown to comprise a pillow block 7135 containing a bearing, not shown, which rotatably supports return roller shaft 7137 on which is mounted return roller 7139. Return roller assembly 7114 is similarly formed.

Figure 19:
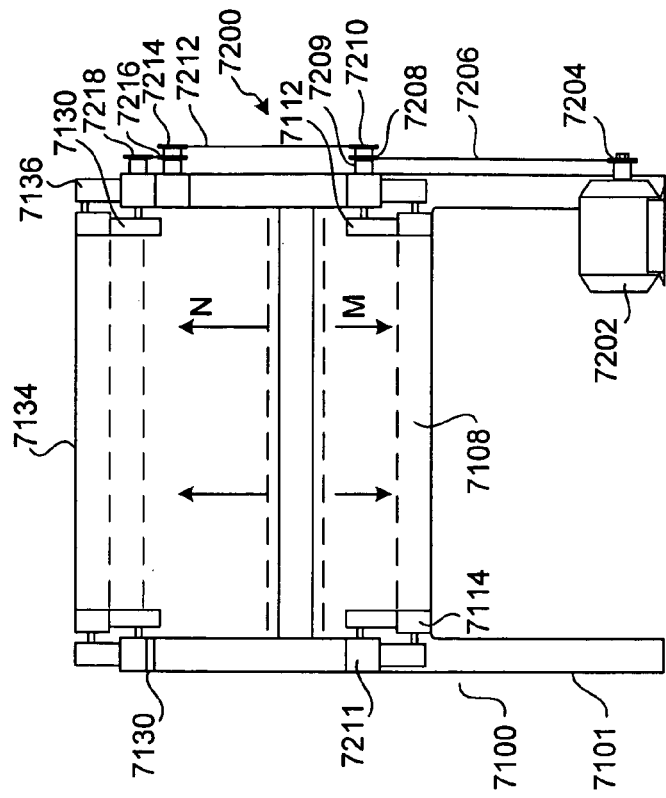
FIG. 19 is a rear view of one apparatus for performing the continuous dye transfer methodology of the present invention, prior to applying a clamping pressure between the upper and lower platen assemblies.

FIG. 19 illustrates the cut-feed, or rear aspect, of apparatus 7100 according to this embodiment of the present invention. Again, it will be appreciated that the movement of belts 7134 and 7108 in the indicated directions, "N" and "M" at this stage of the image processing, serves to advance the imaging pair through the apparatus and thence to release clamping pressure therefrom. In this manner, the imaging pair 67, comprising substrate 61 and dye transfer sheet 63 are transported through, and imaged by apparatus 7100 in a continuous fashion.

Also shown in FIG. 19 are details relating to drive assembly 7200. In the embodiment of the present invention illustrated in this figure, drive 7200 includes a rotary power source, for instance an electric motor 7202, to the output shaft of which is attached motor sprocket 7204. Motor sprocket 7204 imparts rotation to lower drive roller 7112 by means of lower drive chain 7206 and lower drive sprocket 7208. Lower drive sprocket 7208 imparts, by means of lower drive shaft 7209, rotation to lower drive roller 7112. Lower drive shaft 7209 is rotatably mounted on its opposite side into a bearing assembly 7211.

Also mounted on lower drive shaft 7209 is intermediate drive sprocket 7210. Intermediate drive sprocket 7210 imparts rotary motion to upper drive sprocket 7214 by an upper drive chain 7212. In this embodiment of the present invention, it should be noted that the sizing of lower drive sprocket 7208, intermediate drive sprocket 7210, and upper drive sprocket 7214 are identical. In this manner, the speeds of advance of upper and lower belts 7134 and 7108 are matched, so that the upper and lower belts move synchronously.

In order to provide the requisite reversal of rotation between upper and lower drive belts 7134 and 7108, a pair of reversing gears, first reversing gear 7216 and second reversing gear 7218 are employed. First reversing gear 7216 is driven by upper drive sprocket 7214. First reversing gear 7216 meshes with second reversing gear 7218, providing the requisite reversal of rotation. Again, it should be noted that first and second reversing gears 7216 and 7218 are identically sized in order to retain the equality of motion between upper and lower belts 7134 and 7108.

After the substrate has been cooled below the glass transition temperature, the clamping pressure may be removed, and the image carrier may be removed from the substrate. Cooling the substrate to a temperature below the glass transition temperature before the pressure is removed may allow the clamping pressure to prevent warping and may allow the image carrier to be more easily removed from the substrate.

Figure 20:
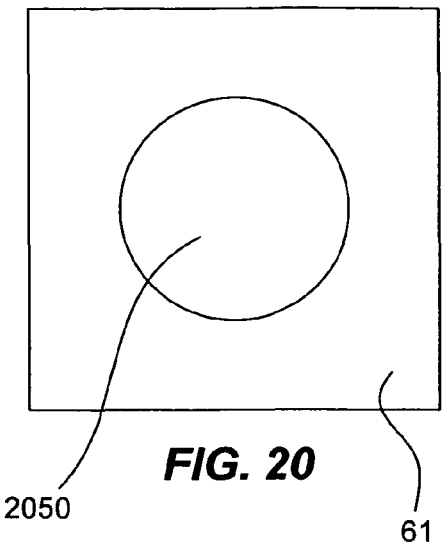
FIG. 20 is a top schematic view of a substrate and image.
Figure 21:
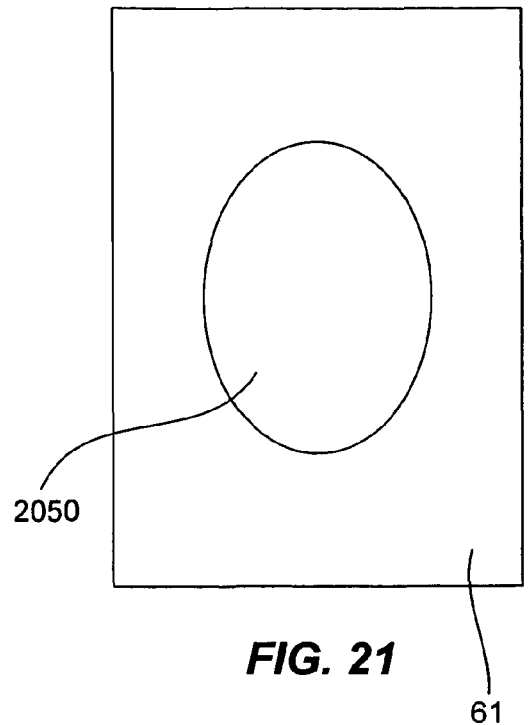
FIG. 21 is the top schematic view of the substrate and image after thermal forming.
Figure 22:
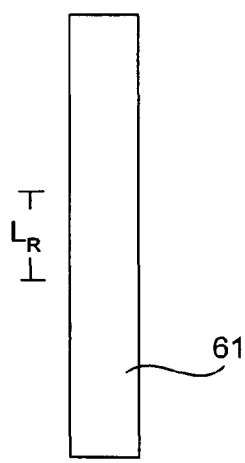
FIG. 22 is a side view of a substrate.
Figure 23:
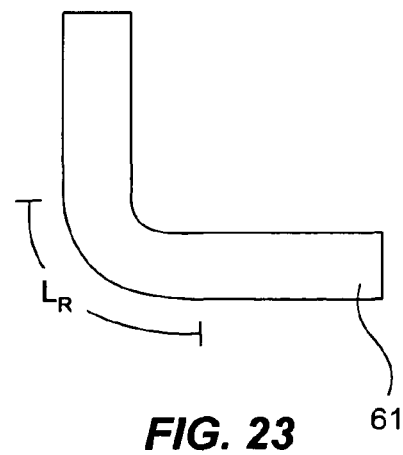
FIG. 23 is the side view of the substrate after thermal forming.

The substrate subsequently may be reheated to a temperature between 275° F. and 400° F. to allow thermal forming of the substrate. The substrate may be thermal formed where an elongation of more than 40% of a region of the substrate may occur. An elongation of between 45-60% would not cause the image at the region of elongation to thin (significantly reduce the intensity of the image). FIG. 20 is a top view of a resulting substrate 61 with an image 2050. The substrate 61 may be heated above the glass transition temperature, thermal form elongated, and then cooled. FIG. 21 shows the substrate 61 after it has been heated and thermal form elongated about 50%. A 50% elongation is defined as having a final length about 50% greater than the original length. The image 2050 has also undergone an elongation. Since the sublimated images are dyed several millimeters into the substrate, it is believed that the elongated image will have at least 75% of the intensity as the original image. It is believed that such elongation will not significantly reduce image intensity (thin), so that the intensity of the elongated image may even be greater than 90% or 99% of the original image intensity. FIG. 22 is a side view of a substrate 61 with a region length $L_R$. The substrate 61 is heated above the glass transition temperature and thermal form bent, so that the region length $L_R$ is increased by more than 50%, as shown FIG. 23. The inventive sublimated image in this region does not significantly reduce image intensity.

The provision of a continuous pressure from the heating region to the cooling region may help to provide the desired image. Without being bound by theory, it is believed that, since the pressure is not removed as the substrate and image carrier passes from a heated region to a cooling region, the image quality is improved. It is further believed that, if the pressure is removed and then reapplied as the substrate and image carrier pass from the heating region to the cooling region, the image quality would be reduced and it may be more difficult to remove the dye carrier from the substrate. It is further believed that the continuous pressure helps to keep the substrate from shrinking, enlarging, extruding, or warping in at least one direction and in possibly all directions. Shrinking, enlarging, extruding, and warping may also be limited by the lower temperature and lower pressure required by the invention. The continuous pressure may also be useful in keeping the relative positioning between the substrate and the dye carrier during the heating and cooling cycles.

Although in this embodiment an upper belt and lower belt are used to provide a conveyor system for moving the substrate and dye carrier along a path, other conveyor systems may be used in other embodiments.

Figure 24:
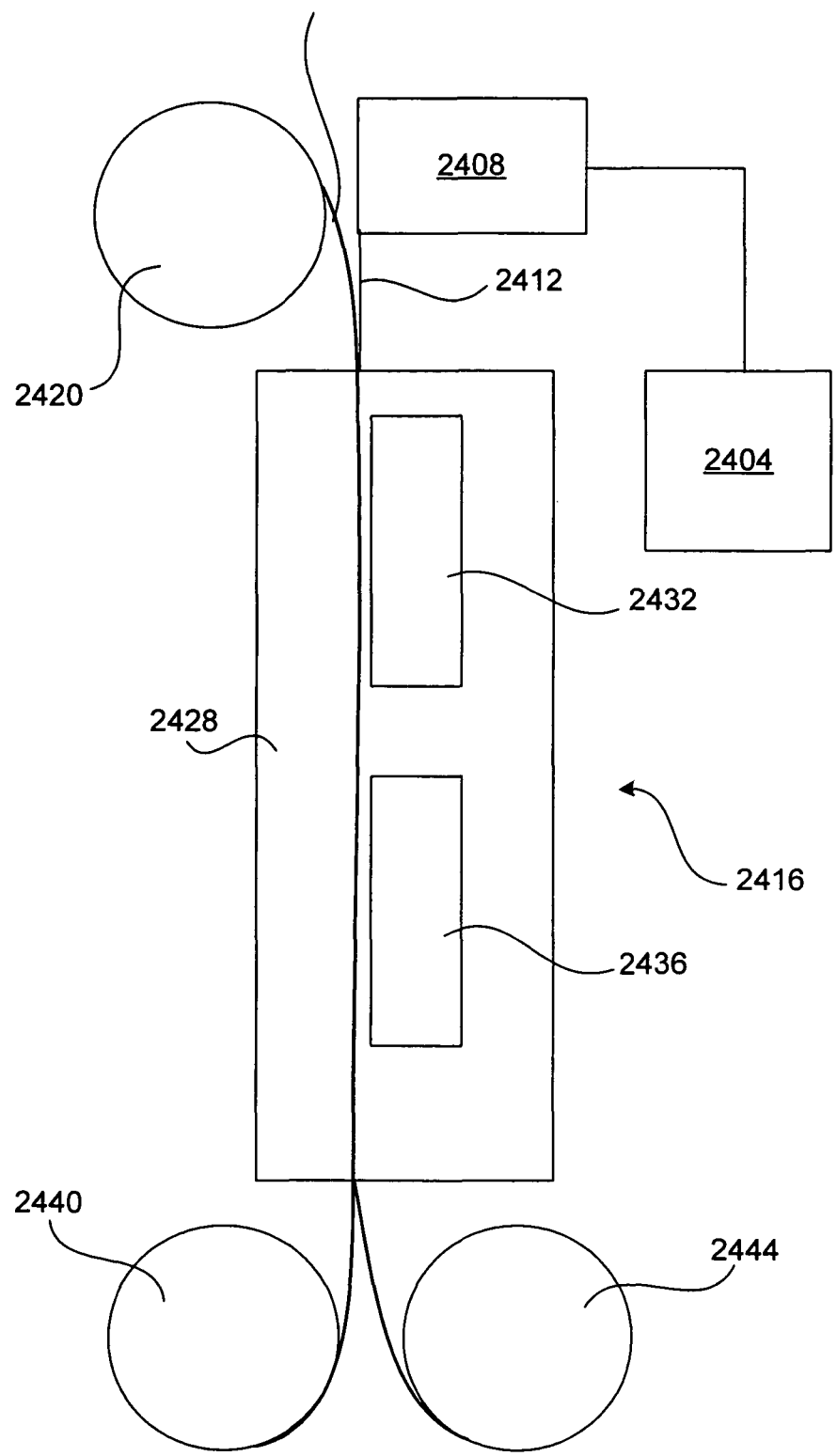
FIG. 24 is a schematic view of another continuous processing system.

FIG. 24 is a schematic illustration of another embodiment of the invention. A computer system 2404 provides print commands to a computer printer 2408. The computer printer 2408 may be an ink jet printer or a laser printer or some other computer printer, which is able to print a digital image from the computer to create an image of dye sublimation dyes on a dye carrier 2412. In this embodiment, the printer 2408 is fast enough to provide a dye carrier that is fed directly into a continuous image transfer system 2416. A feed roll 2420 of a substrate film 2424 provides the substrate film 2424 to the continuous image transfer system 2416. The substrate film 2424 and the dye carrier 2412 are pressed together with a continuous pressure by a continuous pressure system 2428. In a first part of the continuous pressure system 2428, the substrate 2424 and dye carrier 2412 are heated to a sublimation temperature, which is a temperature above the substrate's glass transition temperature by a heater 2432. The substrate 2424 and dye carrier 2412 then move to a second part of the continuous pressure system 2428, where the substrate 2424 and image dye carrier 2412 are cooled to a temperature below the substrate's 2424 glass transition temperature by a cooler 2436. The substrate 2424 and the image dye carrier 2412 are then removed from the continuous pressure system 2428, where the substrate 2424 is separated from the dye carrier 2412 and the substrate 2424 is placed on an output roller 2440. The spent dye carrier may also be collected on a carrier output roll 2444. As described above, the continuous pressure system 2428 provides a continuous pressure from before the heating until after the cooling. The carrier output roll 2444, may be powered and used to help convey the substrate and dye carrier through the continuous pressure system 2428, making the carrier output roll 2444 part of a conveyor.

Ink jet printers are able to provide inexpensive images of dye sublimation ink. Images printed on a computer printer, such as an ink jet printer, allow a user to not need to store and transport any dye carrier with an image. Instead, the image may be placed on the dye carrier on demand. Since dye sublimation inks printed on a dye carrier are perishable, being influenced by humidity and temperature, it is desirable to not need to store and transport such items. Large numbers of digital images may be stored on the computer 2404 or transferred to the computer and may be manipulated by the computer for a customized image, allowing the system to provide a large number of available images that may be sublimated, into the substrate with no inventory requirement. The computer printer is able to print the different digital images and customized digital images on the computer to the dye carrier.

The resulting substrate film 2424 may be laminated to a thicker substrate with the image between the substrate film and the thicker substrate, or the resulting substrate film 2424 with the image may be placed in an injection mold, with the image facing the interior of the mold. The substrate film 2424 may be formed after the image is transferred to the substrate film and before the substrate film is placed into the mold, to allow the preformed film to be more easily placed in the mold. A plastic may then be injected into the injection mold. The image will sublimate into the injected plastic, and the substrate film may act as a protective image coating. The plastic and substrate film may be cooled and then removed from the mold. Generally, such substrate films would be clear enough to allow the image to be seen through the substrate film.

In the alternative, a dye carrier may be placed in the injection mold, with the image facing the interior of the injection mold. Plastic may then be injected into the mold. The plastic may be cooled and removed from the mold. The dye carrier may be removed from the plastic, leaving the image sublimated into the plastic.

Figure 25A:
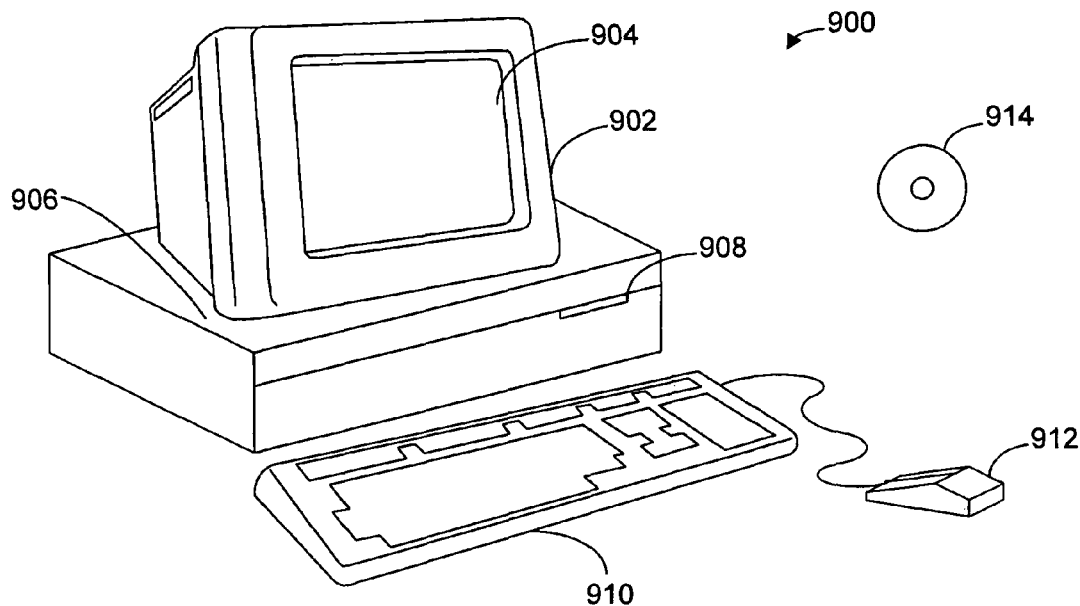
FIGS. 25A and B are schematic views of computers that may be used in the embodiments of the invention.
Figure 25B:
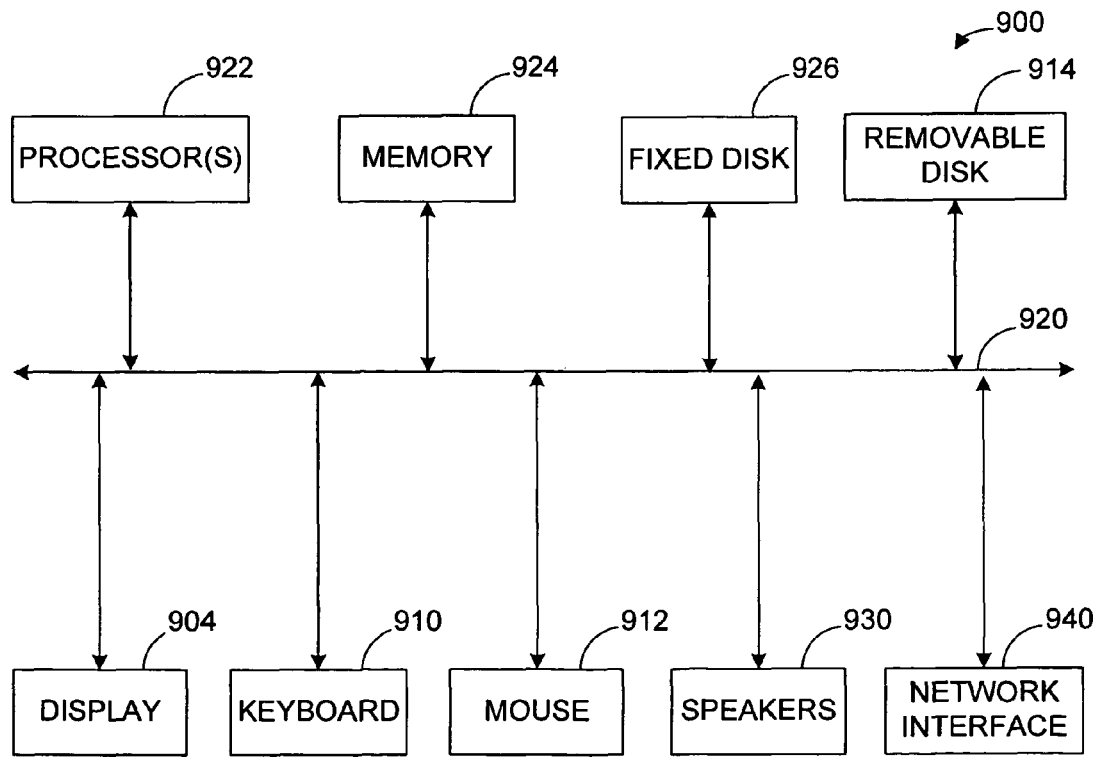

FIGS. 25A and 25B illustrate a computer system 900, which is suitable for implementing embodiments of the present invention. FIG. 25A shows one possible physical form of the computer system. Of course, the computer system may have many physical forms ranging from an integrated circuit, a printed circuit board, and a small handheld device up to a huge super computer. Computer system 900 includes a monitor 902, a display 904, a housing 906, a disk drive 908, a keyboard 910, and a mouse 912. Disk 914 is a computer-readable medium used to transfer data to and from computer system 900.

FIG. 25B is an example of a block diagram for computer system 900. Attached to system bus 920 are a wide variety of subsystems. Processor(s) 922 (also referred to as central processing units, or CPUs) are coupled to storage devices, including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable type of the computer-readable media described below. A fixed disk 926 is also coupled bi-directionally to CPU 922; it provides additional data storage capacity and may also include any of the computer-readable media described below. Fixed disk 926 may be used to store programs, data, and the like and is typically a secondary storage medium (such as a hard disk) that is slower than primary storage. It will be appreciated that the information retained within fixed disk 926 may, in appropriate cases, be incorporated in standard fashion as virtual memory in memory 924. Removable disk 914 may take the form of any of the computer-readable media described below.

CPU 922 is also coupled to a variety of input/output devices, such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter. Computer readable media may also be computer code transmitted by a computer data signal embodied in a carrier wave and representing a sequence of instructions that are executable by a processor.

Figure 26:
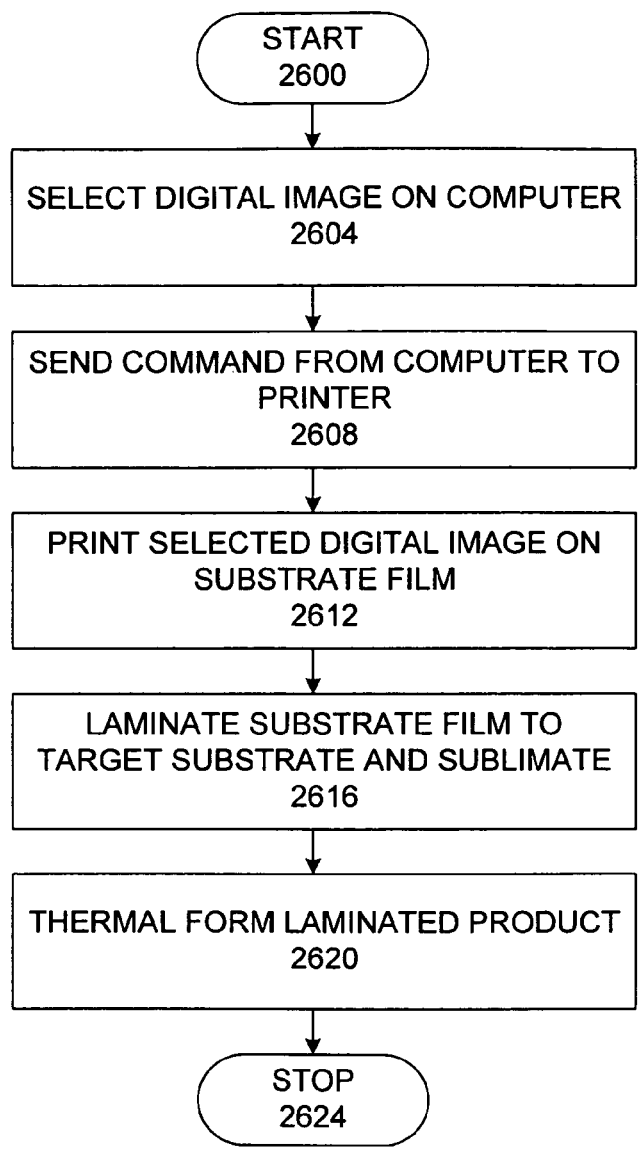
FIG. 26 is a flow chart for process used in another embodiment of the invention.
Figure 27:
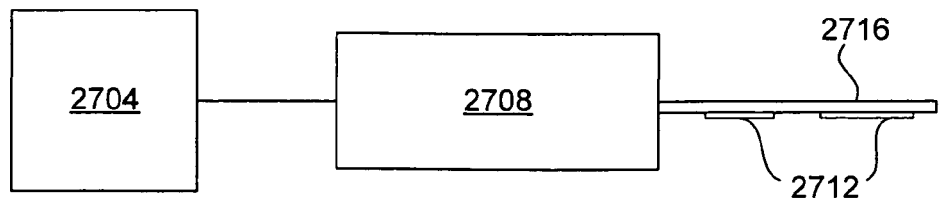
FIG. 27 is a schematic view of a computer and printer used for printing on a substrate film.

FIG. 26 is a flow chart of another embodiment of the invention. First a digital image is selected on a computer. FIG. 27 is a schematic illustration of a computer 2704. Digital images may be stored on the computer 2704 or transferred to the computer and may be manipulated by the computer for a customized image, allowing the system to provide a large number of custom images. A command is sent is sent from the computer to the printer 2708 to print the selected image (step 2608). Generally, computer printers such as inkjet printers and laser printers receive a command where a digital image is represented by computer data, which is interpreted by the printer to print the digital image. Such data may represent pixel points or raster points or may be a vector format. The printer 2708 prints the selected digital image 2712 on the substrate film 2716 (step 2612). The printer 2708 uses sublimation dyes to print the digital image 2712 on the substrate film 2716. In this example, the substrate film 2716 is provided in separate sheets. In another embodiment, the substrate film may be a continuous film on a roller. The substrate film 2716 is then laminated to a target substrate, and the image 2712 is sublimated into the target substrate (step 2616).

Figure 28:
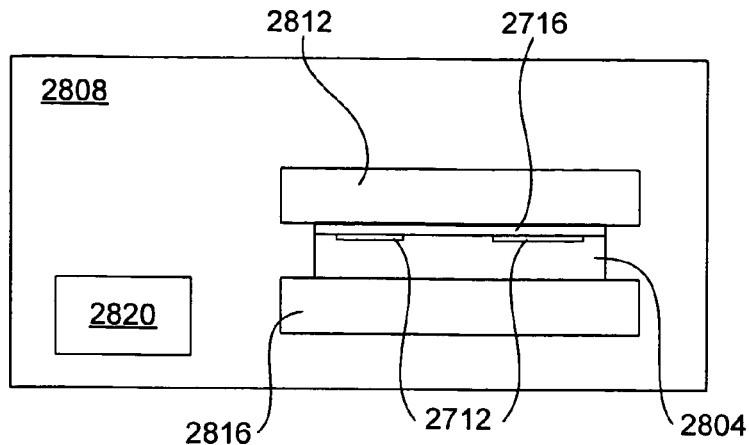
FIG. 28 is a schematic view of a hot lamination and sublimation system.

FIG. 28 is a schematic illustration of the substrate film 2716 being laminated to a target substrate 2804 in a lamination device 2808. In this example, the lamination device 2808 is a hot lamination device, comprising an upper platen 2812, a lower platen 2816, and a heating device 2820. The upper platen 2812 and lower platen 2816 provide a press for pressing the substrate film 2716 against the target substrate 2804, so that the image 2712 is between the substrate film 2716 and the target substrate 2804. The heating device 2820 heats the film substrate 2716 and the target substrate 2804 to provide hot lamination. The heating may also be used to sublimate the image 2712 into the target substrate 2804 so that lamination and sublimation are simultaneous. The laminated film substrate 2716 and target substrate 2804 with the sublimated image may be removed from the lamination device and cooled.

The resulting product is a dye sublimated image in a target substrate with a protective film substrate cover. Such a film substrate may be at least partially transparent to allow the dye sublimated image to be seen. The resulting product may be heated and thermal formed (step 2620) in the manner shown in FIGS. 20-23. The dye sublimated image is resistant to thinning.

Figure 29:
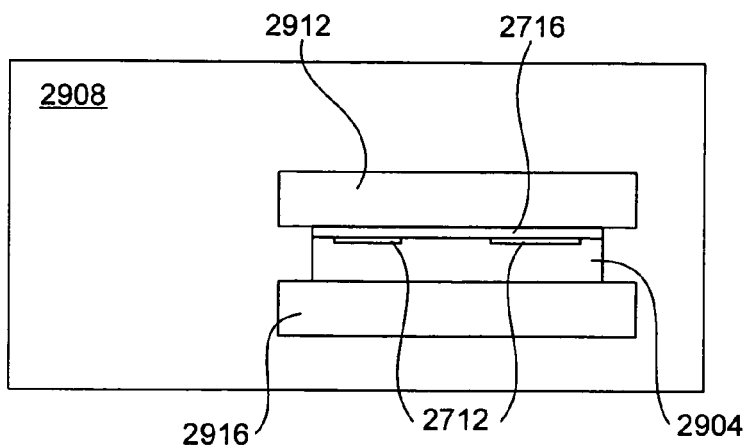
FIG. 29 is a schematic view of a cold lamination system.
Figure 30:
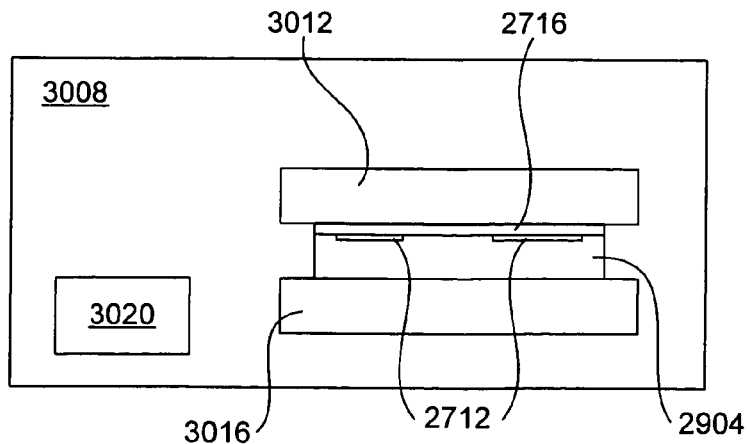
FIG. 30 is a schematic view of a sublimation system.

In the alternative, the lamination may be provided by a cold lamination device 2908, as shown in FIG. 29. Such a cold lamination device 2908 may have an upper press 2912 and a lower press 2916 to press the image 2712 side of the substrate film 2716 against the target substrate 2904. An adhesive may be used to provide lamination instead of heat. The laminated substrate film 2716 and target substrate 2904 may then be placed in a sublimation device 3008. An upper platen 3012 and a lower platen 3016 may be used to hold the substrate film 2716 and target substrate 2904, while a heater 3020 provides heat to cause dye sublimation.

The hot and cold lamination devices 2808, 2908 illustrated above may also be used to laminate the substrate film with a sublimated image to a thicker substrate, as described earlier.

An list of plastic substrates that may be used in the above embodiments comprises, PVC, PVF, PET, PBT, polyesters, polycarbonates, acrylic alloys, Lexan™ by GE, Valox™ by GE, Atoglas Solar Kote™, Plexiglas™, Tedlar™ by Dupont, and Korad™ Polymer Extruded Products.

From the foregoing discussion of several embodiments of the present invention, the ordering or spatial arrangement of the several elements of these embodiments was presented. It will be appreciated that these are by way of illustration and not limitation, and the present invention specifically contemplates modifications thereto.

Finally, while certain plastic substrates have been presented as examples herein, the present invention has been found to be useful for imaging a vast array of different plastics. Accordingly, the principles of the present invention specifically contemplate the application thereof to a wide variety of plastics, and the examples presented herein are by way of illustration and not limitation.

The present invention has been particularly shown and described with respect to certain preferred embodiments of features thereof. However, it should be readily apparent to those of ordinary skill in the art that various changes and modifications in form and detail may be made without departing from the spirit and scope of the invention as set forth in the appended claims. In particular, the principles of the present invention specifically contemplate the incorporation of one or more of the various features and advantages taught herein on a wide variety of dye sublimation apparatuses.

While examples of such alternatives have been presented herewith, it will be appreciated by those of skill in the art that alternative orientations of the several elements taught herein, alternative heating and cooling methodologies, clamping methodologies, and methods for positioning and indexing platen assemblies may, with equal facility, be implemented to enable the features and advantages taught herein. Similarly, while discussion of the invention disclosed herein has centered on the utilization of that invention for forming dye sublimation images in solid sheets of plastic, study of the principles enumerated herein will elucidate to those having skill in the art that these principles are applicable to a wide variety of substrates, including natural and man-made substances, films and polymer-coated materials, including polyesters. Each of these alternatives is specifically contemplated by the principles of the present invention.

What is claimed is:

1. A method of forming a formed object with a sublimated image, comprising:
   providing a dye carrier with an image;
   placing the image of the dye carrier in contact with a first surface of a substrate;
   heating the dye carrier to a temperature above a glass transition temperature of the substrate, while in a continuous process machine, wherein the heating is sufficient to cause lamination of the dye carrier to the substrate;
   cooling the dye carrier to a temperature below the glass transition temperature of the substrate, while in the continuous process machine;
   heating the laminated dye carrier and substrate after cooling the dye carrier; and
   thermal forming the laminated dye carrier and substrate after heating the laminated dye carrier and substrate, wherein the thermal forming of the dye carrier and substrate provides a greater than 40% elongation in a region of the substrate, and wherein the sublimated image is not thinned.

2. The method, as recited in claim 1, wherein the providing the dye carrier with an image, comprises printing the image on the dye carrier using an ink jet printer.

3. The method, as recited in claim 1, wherein the continuous process machine provides a continuous pressure from before heating the dye carrier until after cooling the dye carrier, wherein the continuous pressure limits shrinking, enlarging, extruding, and warping of the substrate in a plurality of directions during the steps of heating the dye carrier and cooling the dye carrier.

4. The method, as recited in claim 1, wherein the heating the substrate heats the substrate to a temperature of at least 275° C.

5. A method of forming a sublimated image in a laminated substrate, comprising:
   provide a film with an image on a first side of the film;
   placing the film on a surface of a substrate so that the image is on and in contact with the surface of the substrate;
   laminating by heat or adhesive the first side of the film to the substrate;
   sublimating the image into the substrate;
   cooling the laminated film and substrate, after the sublimating the image into the substrate;
   heating the laminated film and substrate after cooling the laminated film; and
   thermal forming the laminated film and substrate after heating the laminated film and substrate, wherein the thermal forming of the film and substrate provides a greater than 40% elongation in a region of the substrate, and wherein the sublimated image is not thinned.

6. The method, as recited in claim 5, wherein the providing the film with an image, comprises:
   placing the film in a printer; and
   printing the image on the first side of the film.

7. The method, as recited in claim 6, wherein the providing the film with an image, further comprises:
   selecting a digital image on a computer; and
   sending a command to the printer to print the digital image.

8. The method, as recited in claim 7, wherein the selecting the digital image, comprises customizing the digital image.

9. The method, as recited in claim 5, wherein the laminating the first side of the film to a substrate and the sublimating the image into the substrate are performed simultaneously.

10. The method, as recited in claim 5, wherein the film is placed in contact with a surface of the substrate.

11. The method, as recited in claim 5, wherein the first side of the film is in contact with a surface of the substrate.

12. A method of providing a sublimated image on a plastic substrate, wherein the substrate is a substrate film, comprising:
   selecting a digital image on a computer;
   using a computer printer to print the selected digital image on a dye carrier with dye sublimation inks;
   placing the image of the dye carrier in contact with a first surface of a substrate film;
   heating the dye carrier to a temperature above a glass transition temperature of the substrate film, while in a continuous process machine;
   cooling the dye carrier to a temperature below the glass transition temperature of the substrate film, while in the continuous process machine;
   removing the dye carrier from the substrate film after cooling the dye carrier, wherein the image has been sublimated into the first surface of the substrate film;
   laminating the substrate film to a thicker substrate after removing the dye carrier from the substrate film, by heating the substrate film and thicker substrate to cause lamination;
   heating the substrate; and
   thermal forming the substrate, wherein the thermal forming of the substrate provides a greater than 40% elongation in a region of the substrate, and wherein the sublimated image is not thinned.

* * * * *